(12) United States Patent
Kanaya et al.

(10) Patent No.: US 6,787,020 B2
(45) Date of Patent: Sep. 7, 2004

(54) ELECTROLYTIC OZONE WATER PRODUCTION METHOD AND DEVICE THEREFOR AND SOLID POLYMER ELECTROLYTE MEMBRANE REGENERATING METHOD

(75) Inventors: Takafumi Kanaya, Kobe (JP); Noriaki Okubo, Kobe (JP)

(73) Assignee: Shinko Plant Construction Co., Ltd., Kobe (JP)

( * ) Notice: Subject to any disclaimer, the term of this patent is extended or adjusted under 35 U.S.C. 154(b) by 312 days.

(21) Appl. No.: 09/926,344

(22) PCT Filed: Feb. 2, 2001

(86) PCT No.: PCT/JP01/00779

§ 371 (c)(1),
(2), (4) Date: Oct. 17, 2001

(87) PCT Pub. No.: WO01/61074

PCT Pub. Date: Aug. 23, 2001

(65) Prior Publication Data

US 2002/0139690 A1 Oct. 3, 2002

(30) Foreign Application Priority Data

Feb. 17, 2000 (JP) ........................................ 2000-045148

(51) Int. Cl.[7] .............................................. C02F 1/461
(52) U.S. Cl. ..................... 205/626; 205/424; 204/263; 204/266; 204/228.6
(58) Field of Search ................................. 205/626, 424; 204/263, 266, 228.6

(56) References Cited

U.S. PATENT DOCUMENTS 6,458,257 B1 * 10/2002 Andrews et al. ............ 204/263
6,551,490 B2 * 4/2003 Andrews et al. ............ 205/626

FOREIGN PATENT DOCUMENTS

| JP | 62-186972 | 11/1987 |
| WO | WO 99/29929 | 6/1999 |

* cited by examiner

*Primary Examiner*—Arun S. Phasge
(74) *Attorney, Agent, or Firm*—Oblon, Spivak, McClelland, Maier & Neustadt, P.C.

(57) ABSTRACT

A method and apparatus for producing water containing ozone by electrolysis includes an anodic electrode, a cathode electrode, and a mechanism for advancing and reversing both or at least one of the electrodes, wherein DC voltage is applied between both electrodes in the state of a solid polymer electrolyte membrane pressed by both electrodes, water flows on both sides of the solid polymer electrolyte membrane, water containing ozone is produced at the anodic electrode, and an operation for changing a pressing force is carried out, after which, the pressing force returns to an original pressing force, thereby carrying out a recovery of the solid polymer electrolyte membrane while continuing the production of the water containing ozone.

21 Claims, 25 Drawing Sheets

FIG. 15 (Running data of Example)

ELECTROLYTIC OZONE WATER PRODUCTION METHOD AND DEVICE THEREFOR AND SOLID POLYMER ELECTROLYTE MEMBRANE REGENERATING METHOD

FIELD OF THE INVENTION

The present invention relates to a method for producing water containing ozone by water electrolysis, in detail, the present invention relates to the method and the same apparatus which can produce water containing ozone continually for long time. After here, the term of "water containing ozone" is shown by the tern of "ozone aqua".

BACKGROUND ART

Conventionally, a gas dissolution method and water electrolysis method are known as typical methods for producing ozone aqua. Recently the water electrolysis method attracts attention, and practical use progresses. The gas dissolution method is a method producing ozone aqua by means of dissolving the ozone gas underwater. The water electrolysis method produces ozone aqua by means of the following process in which oxygen is generated at the side of an anodic electrode, the oxygen is converted to ozone by ozonization catalyst and the ozone is immediately dissolved into water flowing in the anode side. In such a water electrolysis method, a small electrolytic apparatus is employed, which uses water available easily as a material and a s small electric power supply having a specification of Several 10 Volt (V)×several 10 amperes (A).

As ozone aqua production methods by a water electrolysis, there are inventions proposed by Japanese Patent Laid-Open No. 1-312092, No. 8-134677 and No. 8-134678. Summary of the apparatus will be described on the basis of a typical example shown in FIG. 17. In the FIG. 17, a solid polymer electrolyte membrane 5 disposes between an anode side casing 1 and a cathode side casing 2, which divides the anode side casing 1 and the cathode side casing 2 so as to be an anode chamber 6 and a cathode chamber 7 respectively. The solid polymer electrolyte membrane 5 is merely described with "membrane" or "electrolyte membrane" afterward. An inner surface of the anode side casing 1 is coating with materials having a corrosion resistance as against ozone such as a fluororesin or a glass. In the anode chamber 6 side, an anode 3 is pressed onto and touched with one face of the electrolyte membrane 5, which comprises noble metals 16 such as a platina having catalyst function for generating ozone. On the other hand, in the cathode chamber 7 side, in similar, a cathode electrode 4 is pressed onto and touched with other face of the electrolyte membrane 5, which has a contact face consisting of noble metal 20 such as a platina or silver. Inflow openings 8,9 and outflow openings 10,11 for material water are formed by each of the anode chamber 6 and the cathode chamber 7. DC voltage is applied between both electrodes 3,4 from a direct-current power source 24 through electrode bars 19,23.

In the apparatus having such a constitution, while the water flows through the anode chamber 6 and the cathode chamber 7 respectively, the direct current is applied between both of the electrodes so as to energize. Then water electrolysis occurs across the electrolyte membrane 5. And oxygen and ozone generate in the anode 3 side, hydrogen generates in the cathode 4 side.
The ozone generated the anode 3 side becomes into ozone aqua to dissolve in water, then flows out from the outflow 10 as ozone aqua.

Here, wire nets 16,20 made with the noble metal such as a platina are employed to portions of the both electrodes 3,4 in contact with the electrolyte membrane 5 respectively in order to generate ozone aqua effectively as disclosed by a Japanese Patent Laid-Open No. 8-134677. In addition, on the back face portions of the both electrodes 3,4 in contact with the electrolyte membrane 5, lath nets 17,21 and electrode plates 18,22 are laminated sequentially and joined by mechanical conjugation methods such as a brazing, spot welding, other mechanical conjugation method so as to be integrated. The lath nets 17,21 are made of a materials such as titanium having the corrosion resistance as against ozone. The electrode bars 19,23 are joined with the electrodes having the integrated configuration as described above. While the material water flows through a duct which is formed by wire net and lath net, or lath net and lath net, intense turbulent flow and eddy current arise. By these flow and current, the ozone which arose in the anode side is instantly dissolved into water. Such a dissolution arises in the anode side continuously and then accumulates. As a result, the ozone aqua with high concentration is provided.

By the way, an ability of electrolyte membrane is getting down (membrane fouling) and a concentration of ozone aqua falls as time elapses while the apparatus as described above runs in succession in order to produce ozone aqua of predetermined concentration with an initialized current density. In order to prevent this problem, a method is taken, which raises current density. To describe in detail, as shown in FIG. 18, the current value A is controlled so as to maintain the concentration X of ozone aqua at a predetermined value Xs while keeping the current density uniformity. The current value rises as running time elapses, and finally, reaches a ceiling value Ae at a time t1. The ceiling value Ae is the maximum value which apparatus can permit. In the condition that the current value has reached the ceiling value Ae, the current value cannot increase any longer. Therefore, the concentration X of ozone aqua decreases gradually, then falls in a predetermined threshold value Xe at the time t2. When ozone concentration reaches this threshold value Xe, generally the running of apparatus is stopped. And the deteriorated electrolyte membrane 5 is exchanged after the apparatus is disassembled. However, according to this operational method, reassembling and disassembling of the ozone aqua production apparatus are troublesome and the apparatus operation efficiency becomes down remarkably, so that a cost for producing ozone aqua becomes expensive.

Therefore, one apparatus is proposed by this applicant et al. in Japanese Patent Application No. 9-340188 (Japanese Patent Laid-Open No. 11-172482), wherein the electrolyte membrane 5 recovers easily without dismantling apparatus so as to reduce the complicated exchange work of the electrolyte membrane.

In this apparatus, the electrode bars 19,23 are respectively connected to in the back faces of the anode electrode 3 and the cathode electrode 4 having the lamination type structure as shown in FIG. 19. At this point, this apparatus is the same apparatus as shown in FIG. 17. However, the structure of the apparatus as shown in FIG. 19 is different form one as shown in FIG. 17 at the following point. In the apparatus shown in FIG. 19, the electrode bars 19,23 pass through through-holes 12,13 respectively. The through-holes 12,13 are respectively formed the anode side casing 1 and the cathode side casing 2. And edges of the electrode bars 19,23 are connected to fluid pressure cylinder devices 14,15 respectively. By this, the anodic electrode 3 and the cathode electrode 4 are able to advance and retreat as against the electrolyte membrane 5 respectively.

Operational method of this apparatus is described in the following.

In FIG. 18, when the current value A reaches to the allowed ceiling value Ae and the concentration X of ozone aqua reaches to the predetermined lower limit value Xe, the running apparatus is stopped (the supplies of the electricity and the water are cut off). And the fluid pressure cylinder 14,15 are actuated as shown in FIG. 20. Then both electrodes 3,4 are respectively apart from the electrolyte membrane 5, the pressing force against to the electrolyte membrane 5 is released. And, by means of keeping this condition for a regular time, the electrolyte membrane is recovered. The both electrodes 3,4 advance toward the electrolyte membrane again, and press the electrolyte membrane 5 by the predetermined pressing force. The supplies of the electricity and the running water are started, and the apparatus is started running again. In other words, the electrolyte membrane which has deteriorated as timewise during the apparatus running, is released from the pressing force and recovered. This operating state is shown in FIG. 22 with a time chart. In similar to the case in FIG. 18, the current value A is controlled so that the concentration X of ozone aqua may be maintained at the predetermined concentration Xs and rises as the running time elapses. At the time t1, the current value A has reached to the ceiling value Ae allowed by the apparatus. As the current value cannot rise any more, the supplies of the electricity and the running water to the apparatus are stopped and the running the apparatus stops. Both electrodes 3,4 are respectively kept apart from the electrolyte membrane 5 as shown in FIG. 20. when this condition is maintained for the predetermined time and the time reaches to the time t3, the both electrodes 3,4 advance to again and press the electrolyte membrane 5. The supplies of the electricity and the running water start again. Then, the running apparatus is started again (at the time t3). Afterward, when the current value A reaches to the ceiling value Ae (at the time t4), the running apparatus is similarly stopped and, after the predetermined time elapses, the running apparatus is started again (at time t5). These above operations are repeated. When the predetermined concentration of ozone aqua is not provided even if the stop and re-staring of the running apparatus are repeated, the electrolyte membrane 5 is exchanged.

In the above case, the number of times for exchanging the electrolyte membrane decrease and the life time of the electrolyte membrane improved. therefor the maintenance of the apparatus can be easy. In these points, this method has the advantages in comparison with the prior method. However, as the apparatus must stop frequently, it is impossible to generate ozone aqua continuously. In this point, this method does not solve the conventional problems basically.

Therefore, the applicant proposes a method improving the above described method in the PCT application (PCT/JP98/5576) that insists on a priority based on Japanese Patent Application No. 9-340188. This method uses also the apparatus for producing ozone aqua by electrolysis as shown in FIG. 19 which has the mechanism for making the both electrodes advance or retreat against the electrolyte membrane. However, this method is different from the above-mentioned method.

To describe in detail, the concentration X of ozone aqua is kept at a constant value Xs as shown in a running time chart of FIG. 23, a process raising current value A is the same process as the above-mentioned method. When the current value A reaches to a ceiling value Ae which is a limit value allowed by the apparatus (time t1). A pressing force P of the electrodes for pressing the electrolyte membrane moves from an initial value P1 to the higher value P2 than P1. Consequently, ozone generation rate improves and the current value A necessary to maintain the predetermined ozone aqua concentration decreases. Accordingly, the current value A falls down from the ceiling value Ae to the normal operation value A0. While the running is continued with this condition, the efficiency of the electrolyte membrane deteriorates again. The current value A necessary to maintain the predetermined concentration of ozone aqua increases gradually again. And the necessary current value reaches to the ceiling value Ae again (time t6). At this time point, the force value P for pressing to the electrolyte membrane moves to the higher value P3 than P2. Consequently, the necessary current value A falls down from the ceiling value Ae to the normal operation value A0 again. Then, the current value A necessary to maintain the predetermined concentration of ozone aqua increases gradually again. And the necessary current value reaches to the ceiling value Ae again (time t7). At this time point, in case that the force value for pressing to the electrolyte membrane can increase more, the similar operations are repeated. However, in case that the force value for pressing to the electrolyte membrane reaches to the set ceiling value, the running apparatus is continued with the condition that the current value is the ceiling value Ae. And, when the concentration X of ozone aqua decreases until under the lower limit value Xe (time t8), the running apparatus is stopped. And, the condition that the electrolyte membrane is pressed by the electrodes is released by a similar way to FIG. 20. Then the stress which acts on the electrolyte membrane is released. Consequently, the membrane function is restored. After that, the following either process is done. One following process is that the electrolyte membrane is pressed by the electrodes again with the initial pressing force value P1, and the supplies of the electricity current and the running water are also started again, then the running apparatus is started again. Other following process is that the apparatus is disassembled and the electrolyte membrane is exchanged, then the running of apparatus is started again.

According to this method, even if the necessary current value A reaches to the ceiling value Ae, the necessary current value can falls down by means of making the force P for pressing to the electrolyte membrane by the electrodes increases. Consequently, the running continuation clock time of the apparatus gets longer by leaps and bounds. However, when the pressing force P by the electrodes reaches to the ceiling value, the running apparatus must be stopped and waited for the reactivation of the efficiency of the membrane. In this point, the continuous running which extends over long term is impossible.

Therefore it is for the greatest purpose of the present invention to obtain a long term continuous running in the electrolysis type ozone aqua production method to improve each betterment method more, which is the heart's desire.

DISCLOSURE OF INVENTION

The present invention has been done under such a point of view, and the present invention includes two methods fundamentally. At first, the first method will be shown in the following. A ozone aqua production method uses an ozone aqua production apparatus which comprises an anodic electrode disposed on one side of an electrolyte membrane, which has a catalyst function for generating ozone, a cathode electrode disposed on other side of the electrolyte membrane, the mechanism which enables both or at least one of both electrodes to advance and retreat. In the ozone aqua production method, DC voltage is applied to between the both electrodes in the condition that the both electrodes press against the electrolyte membrane, ozone aqua is generated at the side of anode by means of water electrolysis to supply water onto both sides of the electrolyte membrane, further, a pressing force condition varies with a preset condition in the state that water and electricity are continuously supplied, and then, returns to the initial pressing force condition, the pressing force condition means one that the anodic electrode, the cathode electrode or the both electrodes press against the electrolyte membrane. Thereby, the electrolyte membrane recovers while the ozone aqua is produced.

In this method, the operation for changing the pressing force against the electrolyte membrane can be carried out by means of decreasing or increasing the pressing force from the electrodes or the combination of these.

In addition, a following pattern for changing the pressing force is preferable, which includes keeping a state lower or upper than the preset pressing force for a regular time. Furthermore, this operation can be done by following two ways. In one way, this operation repeats with the predetermined cycle. In other way, this operation is done once or plural times when it is detected that an ability of producing ozone aqua falls down under the predetermined value. It is optional which method is adopted.

Next, the second method is the method having the operation for varying the current or voltage instead of the operation for varying the pressing force. Concretely, in the state of supplying the water and the electricity continuously, the current value or the voltage value of the direct-current power source varies rapidly in accordance with the preset condition. After that, the current or the voltage varies forcibly so as to return to the initial value or the vicinity. Thereby, the electrolyte membrane recovers while producing ozone aqua.

In this method, the following operation for varying the current or voltage forcibly is preferable, wherein the value varies from the initial value of the operation to a range between 0 or a vicinity minimum value of 0 and a maximum value permissible by the apparatus then the states of the minimum value and the maximum permissible value are respectively held for a regular time, after that, the value returns to the initial value or the vicinity of it. In addition, as concerns a frequency of the operation for varying the value forcibly, there is the following case. One case is that this operation repeats by the predetermined cycle. Another case is that, this operation is done once or the plural times when it is detected that the concentration of ozone aqua or the producing ability deteriorates under the predetermined value, such an operation is.

Besides, in the first and second methods, the electrolyte membrane will not be recovered enough even if the operation for varying the pressing force, or the operation for varying the current or voltage forcibly is carried out. In that case, the production of ozone aqua is stopped and the both electrodes are respectively apart from the electrolyte membrane. This state is kept for the predetermined time then the electrolyte membrane recovers. After that, the production of ozone aqua is started again with the predetermined condition about the operating. According to this method, the life time of the electrolyte membrane can be improved all the more.

Furthermore, there is another way. In this method, when the electrolyte membrane will not be recovered enough even if the operation for varying the pressing force or the operation for varying the current or the voltage forcibly is done, the pressing force value of the electrode against the electrolyte membrane moves to the high pressing force value which is set previously. And the production of ozone aqua is continued. According to this method, it is able to produce ozone aqua continuously for a long time by leaps and bounds.

THE BEST MODE FOR CARRYING OUT THE INVENTION

Figure 19:
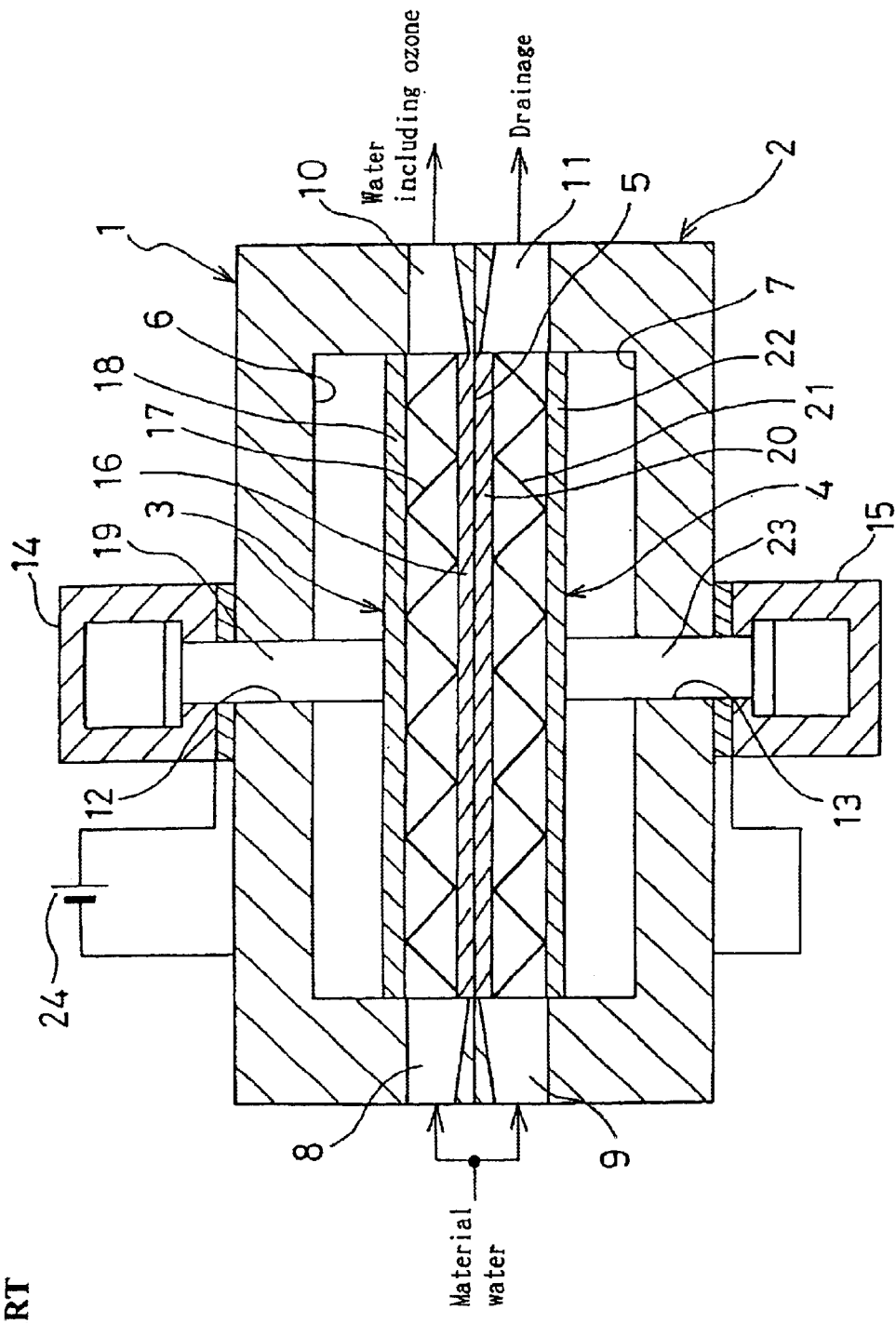
FIG. 19 shows a feature section of a conventional electrolysis type ozone aqua production apparatus and a feature section of another example of an electrolysis type ozone aqua production apparatus using in the present invention.
Figure 21:
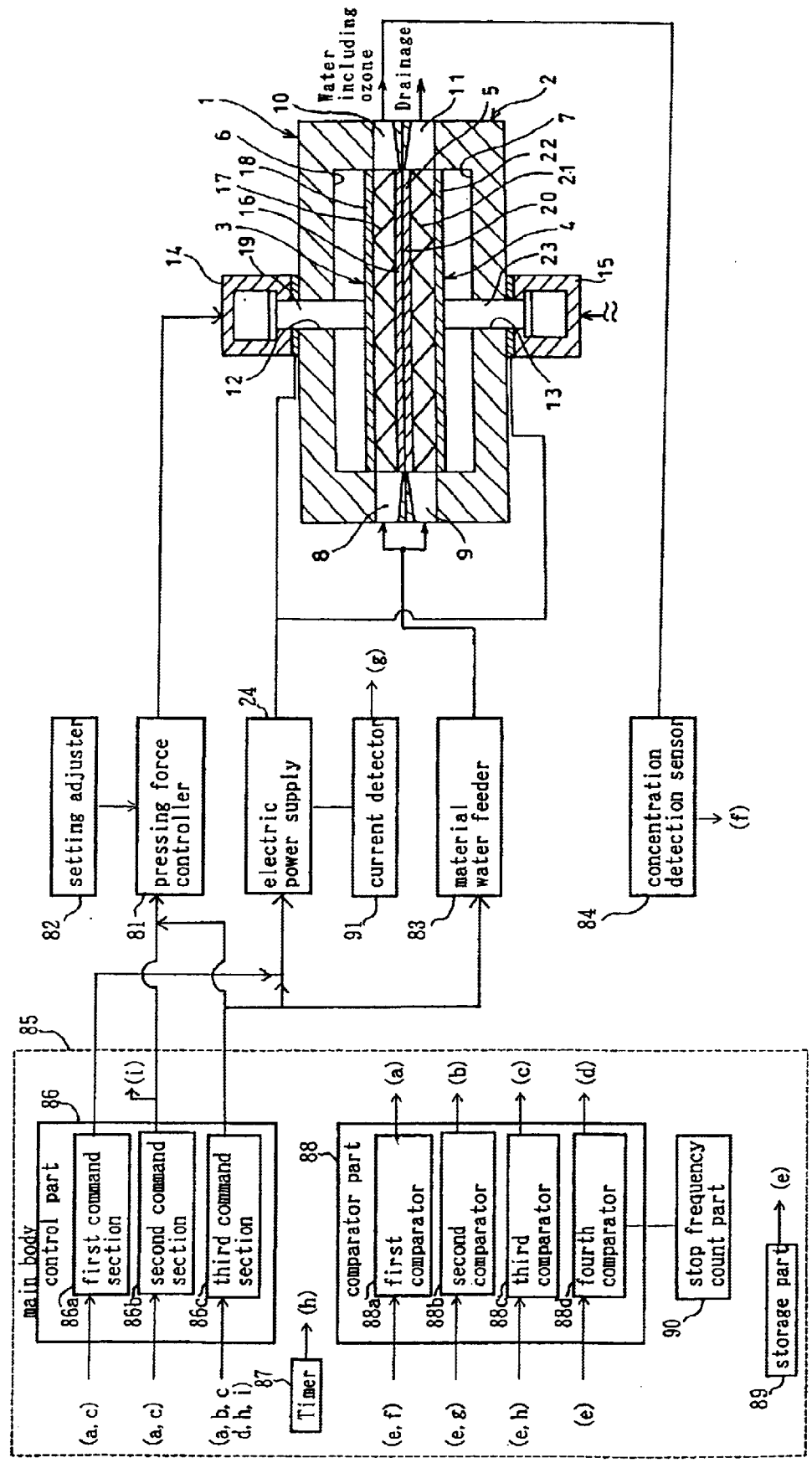
FIG. 21 shows a conception diagram of a control system in an electrolysis type ozone aqua production apparatus of the present invention.

The present invention will be described in detail by drawings as follows. At first, the first method of the present invention will be described. As shown in FIG. 21, an ozone aqua production apparatus in this method comprises a main body 1 of the ozone aqua production apparatus, a pressing force controller 81, a setting adjuster 82 of pressing force, an electric power supply 24, a material water feeder 83, a concentration detection sensor 84 of ozone aqua having a detector and a main controller 85 of the ozone aqua production apparatus. Here, in the main body 1 of the ozone aqua production apparatus, the portion having the same symbol as in the apparatus of FIG. 19 shows the same constitution as in FIG. 19. So, a repeating explanation is omitted.

The pressing force controller 81 is connected to an advance or retreat drive parts 14,15 of the main body 1, and controls pressing forces from an anodic electrode 3 and a cathode electrode 4 toward an electrolyte membrane 5. The setting adjuster 82 of pressing force is connected to the pressing force controller 81, and able to set in a predetermined pressing force. The electric power supply 24 is a power source to apply voltage to the both electrodes 3,4, and comprises a current detector 91 for detecting a current value. The material water feeder 83 supplies material water for generating ozone. The concentration detection sensor 84 detects a concentration of ozone aqua.

The main controller 85 comprises a control part 86, a timer 87, a comparator part 88, a storage part 89 of preset value and a stop frequency count part 90, which sends various kinds of orders to the pressing force controller 81, the electric power supply 24 and the material water feeder 83.

The control part 86 comprises a first command section 86a for sending control orders on the electric power supply 24, a second command section 86b for sending control orders on the pressing force controller 81 and a third command section 86c for putting out control orders about running or rest of apparatus.

The comparator part 88 comprises a first comparator 88a, a second comparator 88b, a third comparator 88c and a fourth comparator 88d.

The first comparator 88a is connected to the concentration detection sensor 84 of ozone aqua, the storage part 89 of preset value, the first command section 86a, the second command section 86b and the third command section 86c.

With respect to the ozone aqua concentration, the first comparator 88a compares a measurement value (X) transmitted from the concentration detection sensor 84 with a desired value (Xs) stored in the storage part 89 at the time of transmitting. And the first comparator 88a outputs a signal showing a deviation of the ozone aqua concentration toward the first command section 86a. On the other hand, when the measured value (X) reaches the desired value (Xs), the first comparator 88a outputs an attainment signal to the second command section 86b.

The second comparator 88b is connected to the current detector 91 of the electric power supply 24, the storage part 89 and the third command section 86c. The second comparator 88b compares the ceiling value (Ae) of the electric power supply, which is stored by the storage part 89, with a detected current value (A) detected by the current detector 91 of the electric power supply 24, then, when the detected current value (A) reaches the ceiling value (Ae), outputs an attainment signal toward the third command section 86c.

The third comparator 88c is connected to the timer 87, the storage part 89, the first command section 86a and the third command section 86c. The third comparator 88c compares an elapsed time (t) which is an elapsed time measured by timer 87 during running or stopping the apparatus, with such a predetermined time (Tc) as preset and stored in the storage part 90, then, when the running time of apparatus or the stopping time (t) reaches the predetermined time (Tc), outputs an attainment signal toward the first command section 86a or the third command section 86c.

And, the fourth comparator 88d compares a stop frequency (N), which is counted by the stop frequency count part 90 for measuring the frequency that apparatus stopped, with such a predetermined stop frequency (Ne) as preset and stored in the storage part 89, then outputs the resultant toward the third command section 88c.

In the storage part 89, the various necessary preset values for running is memorized and stored, which includes a production target concentration (Xs) of ozone aqua which is previously set as an operating condition, a control start concentration (Xm) for starting a predetermined control as described below, a permission lower limit concentration (Xe), a control cycle time (Tc) of the apparatus as described below, a variation pressing force retention time (T1) as described below and a ceiling value of a current value (Ae) etc.

The first command section 86a of the control part 86 outputs an order toward the electric power supply 24. The order is an order which varies a current value (A) supplied between the both electrodes 3,4 according to a signal from the first comparator 88a comparing an ozone aqua concentration so that the ozone aqua concentration (X) may approach to a desired value (Xs).

The second command section 86b is connected to the first comparator 88a, the third comparator 88c and the pressing force controller 81. The second command section 86b outputs an order for varying the pressing forces of the both electrodes 3,4 toward the pressing force controller 81 when it is detected that an elapsed time in state of running the apparatus (t) reaches the setting value (Tc) according to the signal from the third comparator 88c. And, the second command section 86b outputs an order for varying pressing forces of both electrodes 3,4 toward the pressing force controller 81 when it is detected that the concentration (X) of ozone aqua reaches the preset value of the control start concentration (Xm) according to the signal from the first comparator 88a. Further, the second command section 86b outputs an order which exchanges the pressing force of both electrodes 3,4 with an initial pressing force, toward the pressing force controller 81 when it detects that the elapsed time (t) reaches the above-mentioned predetermined value (T1) according to the signal from the third comparator 88c.

The third command section 86c is connected to the first comparator 88a, the second comparator 88b, the third comparator 88c, the electric power supply 24, the material water feeder 83, the pressing force controller 81 and the timer 87. The third command section 86c outputs an order for turning off the electric power supply 24, the material water feeder 83 and a pressure regulator 21 when it detects that a current value reaches the ceiling value (Ae) according to the signal of the second comparator 88*b* and when it detects that the concentration of ozone aqua reaches a lower limit value (Xe) according to the signal from the first comparator 88*a*. Further, the third command section 86*c* outputs an order which works the apparatus again when a predetermined time passes according to the signal from the timer 87, toward the electric power supply 24, the material water feeder 83 and the pressing force controller 81.

Figure 1:
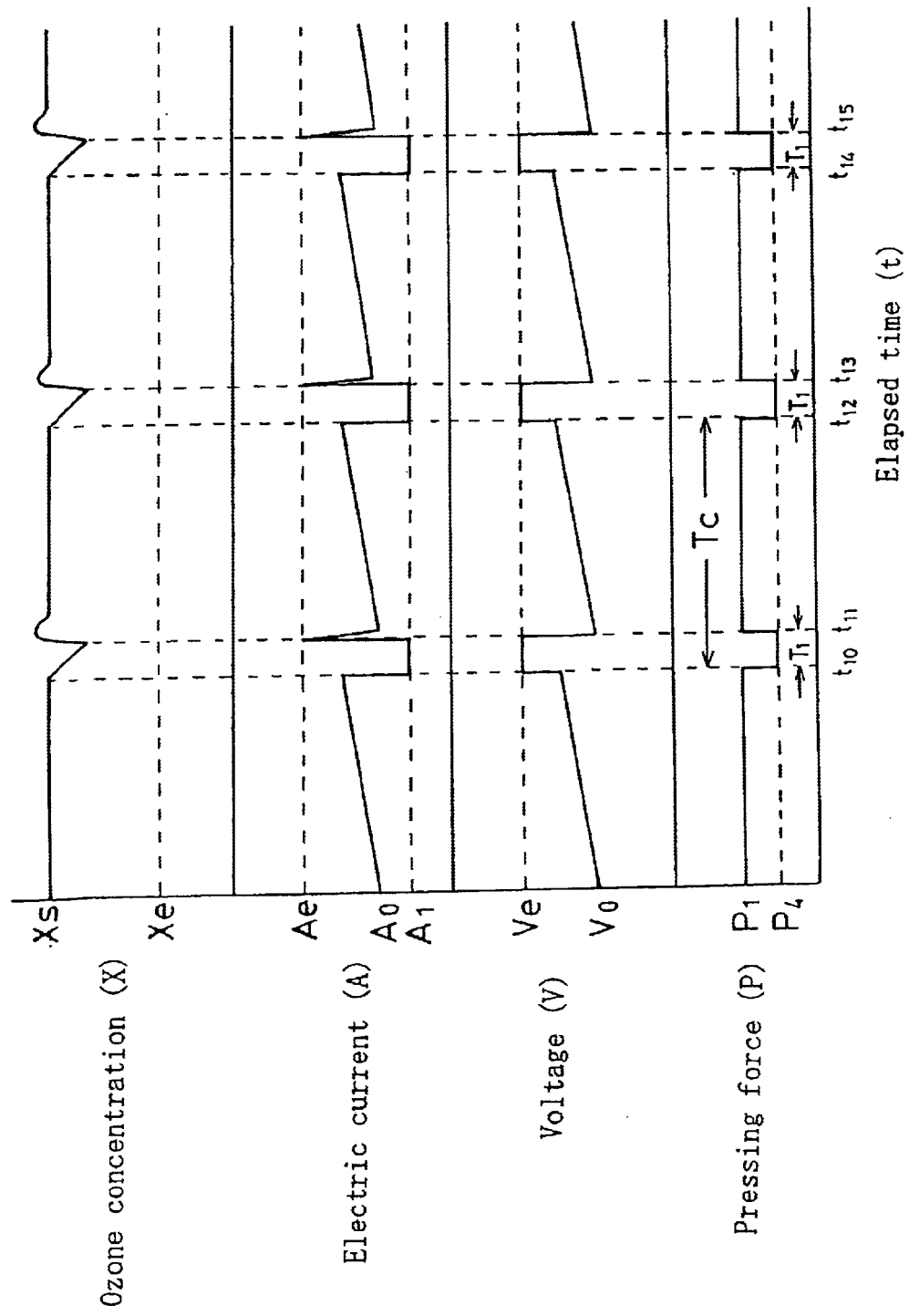
FIG. 1 shows a running time chart in an embodiment concerning the first ozone aqua production method of the present invention.
Figure 2:
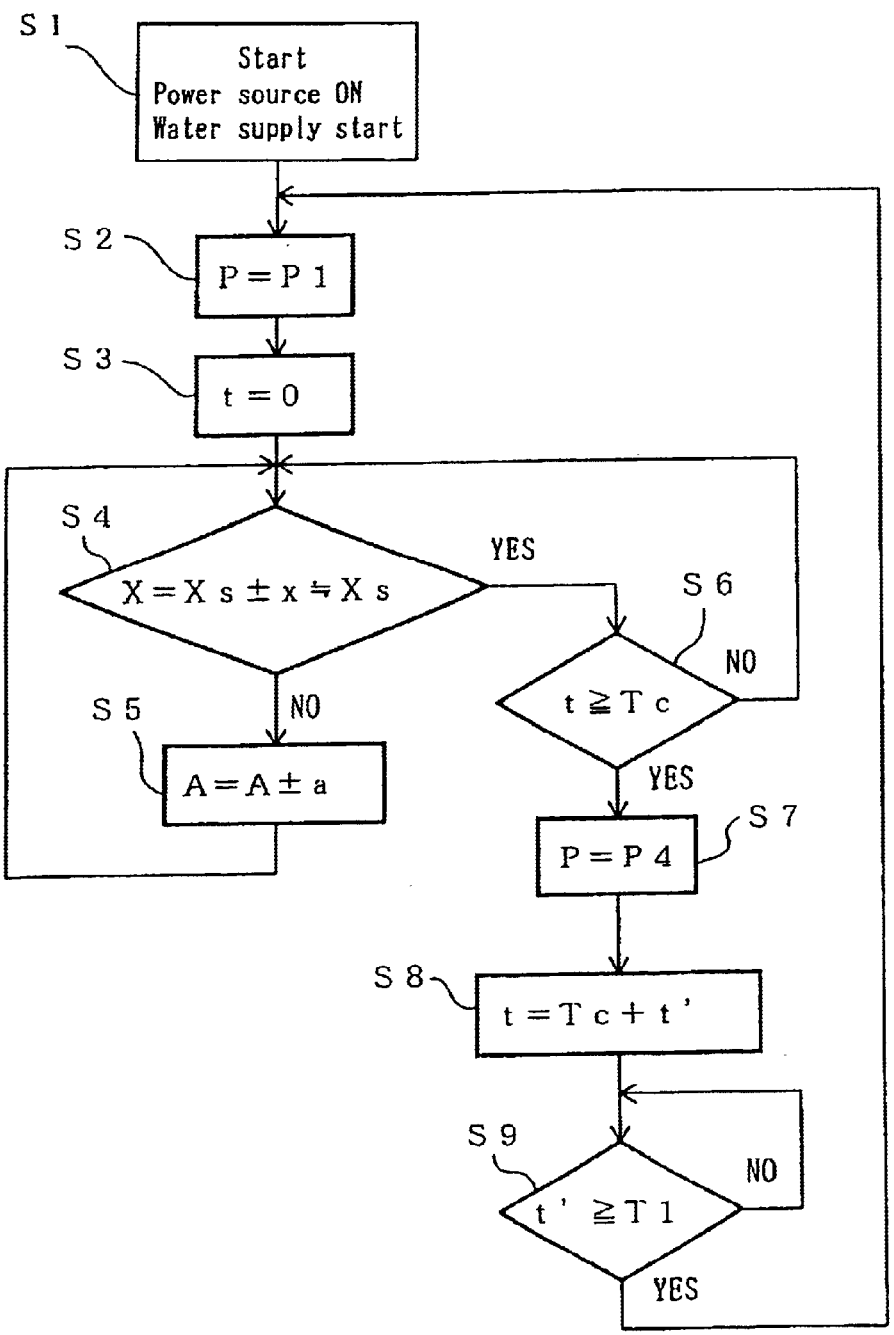
FIG. 2 shows a flow chart concerning an operation control method of FIG. 1.

Next, an embodiment on the first method of the present invention will be explained using such the drawings as FIG. 1 showing a running time chart, FIG. 2 and FIG. 21 showing a flow chart for executing such the run as shown in the time chart of FIG. 1.

At first, in FIG. 2, a main switch of the electric power supply 24 is turned ON at start-up. Then, a supply of electricity to a control system begins, a supply of material water begins at inflow openings 8,9. DC voltage is applied between the both electrodes 3,4 (S 1). Next, the pressing forces of both electrodes 3,4 toward the electrolyte membrane 5 is set to an initial value P1 by the setting adjuster 82 (S2). And, a measurement of an elapsed time t is started by the timer 87 (S 3). When ozone aqua is produced by electrolysis and starts flowing out from the outflow opening 10, the concentration detection sensor 84 starts and continues always detecting a concentration X of the ozone aqua. The first comparator 88*a* compares the detected concentration X with the desired concentration value Xs of ozone aqua (S 4). Here, the desired value Xs is set so as to permit a predetermined dispersion (x), therefore the detected concentration X is really compared with Xs±x (≈Xs). When the concentration of ozone aqua is lower (X<Xs) (S 4, No), the first command section 86*a* puts out a command toward the electric power supply 24. The command is a command for putting up from A to A+a to add a preset current value of a to the recent current value A. And the operation is done with a new current value (S 5). On the other hand, when the concentration X of ozone aqua is higher than the predetermined desired value (X>Xs) (S 4, No), the first command section 86*a* puts out an instruction signal toward the electric power supply 24. The instruction signal is an instruction signal for changing the current value to A−a to reduce the current value from the recent current value A by a. In this manner, the current value A is controlled so that the concentration X of ozone aqua may be always maintained at the vicinity value of the Xs.

FIG. 1 shows an advanced state after the concentration of ozone aqua reached Xs in this manner. During continuing the operations with this state, the values A, V of the current and voltage rise gradually as the time T elapses as shown in FIG. 1 so as to maintain the concentration X of ozone aqua at the concentration Xs as against a deterioration of the electrolyte membrane. Therefore, a suitable time (Tc) is previously set so that the concentration X of ozone aqua may not fall under the allowed lower limit value Xe because of a reduction of an efficiency of the electrolyte membrane. The third comparator 88*c* watches that the running time t elapses. Then, when the elapsed running time t reaches a state of t≧Tc (time t10) (S6, Yes), the pressing force controller 81 is controlled with keeping the supply of the electricity and the water (in other words, with continuing the operation of the apparatus) according to a signal of the second command section 86*b* so that the pressing forces P of the both electrodes 3,4 may vary from the initial value P1 to the low value P4 (S7). And, while the pressing force P changes, the timer begins measuring the elapsed time (t') after starting changing of the pressing force (S8).

For the reason that the contact resistance between the electrolyte membrane 5 and both electrodes 3,4 increases by the reduction of pressing force, the current value A falls down to a current value A1 lower than the initial value A0 and also the concentration X of ozone aqua begins falling from the specified value Xs slightly. On the other hand, the voltage V rises to the maximum voltage value Ve of the power source. In this state, the concentration of ozone aqua continues falling, however, this state is held during a predetermined period of time (T1) until a suitable time (time t11) which falls in the period of time in which the concentration of ozone aqua is maintained in the same or upper value than the permission lower limit value Xe. In other words, the third comparator 88*c* outputs a signal to the second command section 86*b* (S9, Yes) when a condition of t'≧T1 is fulfilled to compare the duration T1 of the low value with the time t' elapsed after changing to the low value. And, a signal is output from the second command section 86*b* to the pressing force controller 81 (Shifted to S2) which a signal for returning the pressing force P to the initial value P1. By the above-mentioned knack, such an operation as the concentration X of ozone aqua is maintained at the predetermined value Xs. is started again. As a result, the concentration X of ozone aqua returns to the predetermined value Xs, also, the current and the voltage are returned to the vicinity of the original values respectively. In addition, just after these returns, the concentration of ozone aqua is less than the preset value Xs. Therefore, in order to restore the concentration of ozone aqua, the current value A rises until to the permission maximum value Ae of the apparatus for an instant. Consequently, the concentration of ozone aqua becomes high. However, when the concentration of ozone aqua returns to the specified value Xs, the current value is returned to the vicinity of the initial value A0.

In the above operation, the period T1 is a period for recovering the electrolyte membrane, in which the pressing forces P of the both electrodes 3,4 against to the electrolyte membrane are maintained at the low pressing force P4. The recovery principle is not clear. However, it is inferred as follows. Deleterious materials (For example, Ion of impurities contained in hydrogen ion and the material water) accumulate in the membrane or on the membrane face as the time elapses as described below.

By means of giving the change of the pressing force against the electrolyte membrane of which function fells down by the deleterious material, an equilibrium state of the deleterious materials is damaged. Consequently, the recovery concerning the ability of the membrane is accomplished.

Similarly, when the elapsed time reaches to a cycle To (time t12), by the above-mentioned knack, the pressing force P falls from the initial value P1 to the value P4. After keeping this state for the fixed period T1 until a time t13, the pressing force returns to the initial value P1 again. Such operations are repeatedly performed without stopping the apparatus, In the above method, the period T1 in which the pressing force is held at the low value P4 (hereinafter, it is called as "the low period") is basically voluntarily determined until the concentration of ozone aqua reaches the allowed lower limit value Xe. Also, the repetition cycle (Tc: the period from t10 to t12) is determined until the concentration of ozone aqua reaches the allowed lower limit value Xe. However, a relation of both must be considered. In other words, when the repetition cycle Tc is long, the low period T1 becomes long. And when the repetition cycle Tc is short, the low time T1 shortens. Generally, when the repetition cycle Tc is set in a rang of 10–30 minutes, the low period T1 is set in a rang of several seconds, i.e. 1–5 seconds.

In addition, when the recovery ability of the electrolyte membrane by means of varying the pressing force nears to the limit, the current value A will become the high value than an initial value A0 even if the pressing force returns the initial value P1. Accordingly, the current value A becomes high gradually at every operation for changing the pressing force. At last, the electric current reaches the ceiling value Ae for only a short time and the concentration X of ozone aqua reaches under the permission lower limit value Xe. Advanced treatments which should be taken after such a state occurs, will be described below.

Figure 3:
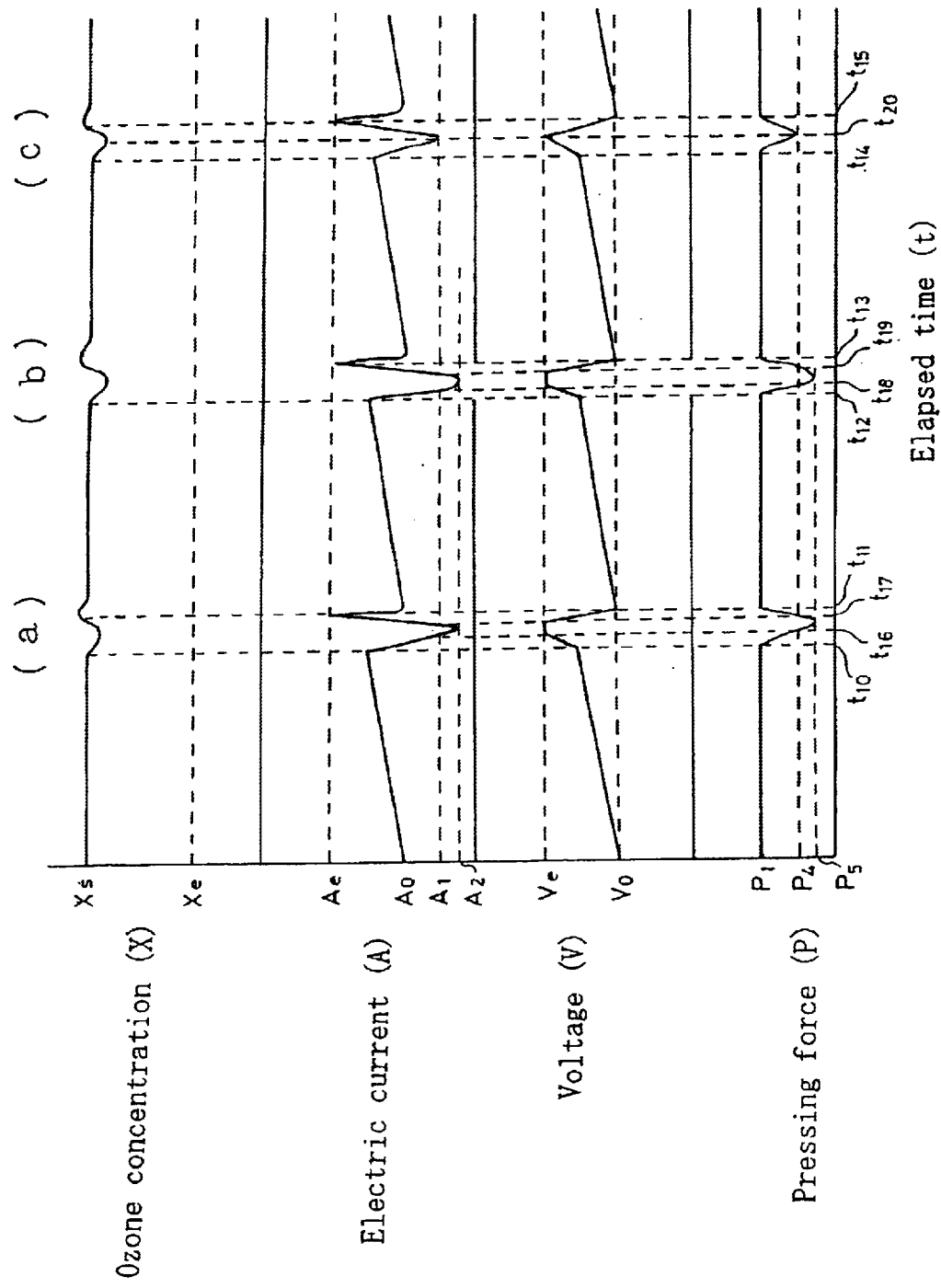
FIG. 3 shows a running time chart in a modification example of a variation of pressing force concerning the method of FIG. 1.

In FIG. 1 as mentioned above of, the pressing force P suddenly changes from the initial value P1 to the low value P4 then the low state is maintained for the regular period (T1). As to the change pattern of the pressing force, there is various kinds of modification examples. FIG. 3 shows the various kinds of examples as to the change pattern of the pressing force.

In FIG. 3(a), the pressing force P varies from the initial value P 1 to a value P5 lower than P4 with V-shaped pattern. In this case, the pressing force is maintained at the value lower than P4 during the predetermined period of times t16–t17. And, as the pressing force P falls down, also the electric current A falls down to a value A2 lower than the low electric current A1 of the case of FIG. 1. Then, as the pressing force P increases, the current value A rises gradually. On the other hand, as the pressing force P falls down, the voltage V rises up. When the voltage V reaches the permission maximum value Ve, the state is maintained. Then, as the pressing force recovers, the voltage V falls down to the initial value V0.

Next, FIG. 3(b) differs from FIG. 3(a) in the point that the pressing force P varies with U-shaped pattern. The pressing force is kept at a value lower than the set low value P4 during the period of t18–t19. Further next, FIG. 3(c) is same as FIG. 3(a) in the point that the pressing force changes with V-shaped pattern. However, as soon as the pressing force reaches the predetermined low pressure P4 at the time t20, the pressing force rises to the value P1 immediately. In other words, in this case, there is no the period in which the pressing force is maintained with the predetermined value lower than the low value P4. But, there is no noticeable problem with this method either. However, in this case, there is a tendency in which the recovery ability of the electrolyte membrane is inferior to such the operations as the operation for changing the pressing force as shown in FIG. 1 and the operation for changing the pressing force of FIG. 3(a) and FIG. 3(b). Accordingly, a consideration is necessary, such as a shortening the repetition cycle or setting the low pressure value P4 further low.

Figure 4:
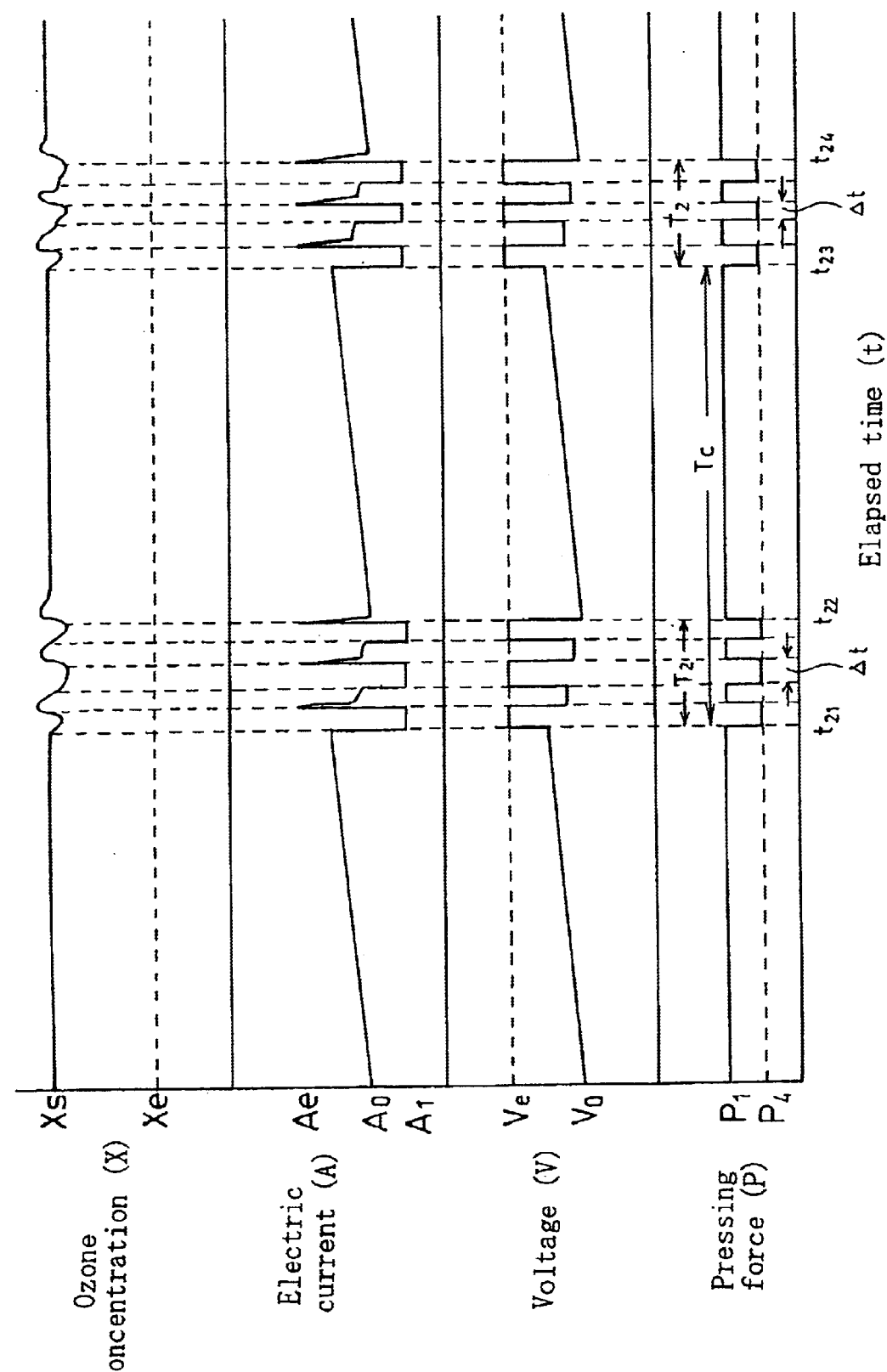
FIG. 4 shows a running time chart in other embodiment concerning the first method of the present invention.

Next, FIG. 4 shows other embodiment with regard to the method of FIG. 1. The pressing force P falls down from the initial value P1 to the low value P4 at a suitable time t 21 which falls in the period where the reduction of the efficiency of the electrolyte membrane is a little during running the apparatus. The above operation is same in case of FIG. 1. In the present embodiment, the return and change of the pressing force are carried out once or plural times in a predetermined period T2 until a time t22 with a pulse-shaped pattern. And this operation is carried out periodically. By means of the operation, the efficiency of electrolyte membrane is gradually restored at every low pressure time ($\Delta$ t).

Also, in this case, the concentration X of ozone aqua varies gradually to repeat decreases and increases while the change of the pressing force is repeated at every minute time ($\Delta$t). When the time reaches t22, the change of the pressing force with the pulse-shaped pattern is stopped. Then, the pressing force returns to the initial value P1 and the running is continued. Further, when the time reaches t23 after the predetermined period (Tc) elapses, the pressing force begins to vary with the similar pulse-shaped pattern. The change of the pressing force is carried out until a time t24. The pressing force returns in the initial value P1 again and the running is continued. The similar operations are repeated afterward.

In addition, when the pressing force varying with this pulse-shaped pattern, the control can be carried out as follows. The elapsed time t from the timer 87 as shown in FIG. 21 and the signal from the storage part 89 memorizing $\Delta$ t are transmitted to the third comparator 88c and compared with each other. The resultant of the comparison is output to the third command section 86c at every $\Delta$ t. And, the change order of the pressing force P is output to the pressing force controller 81 from the third command section 86c.

In this case, with regard to the change of the pressing force, the repetition period (T 2) and the operation cycle (To: the period of t21–t23), similarly to the above said case, are optionally determined in the period by the concentration X of ozone aqua falls down to the permission lower limit value Xe. In addition, when the efficiency of the electrolyte membrane will not recover enough even if the operation for changing the pressing force P is carried out, the concentration X of ozone aqua will reach the permission lower limit value Xe finally. An advanced treatment after this state will be described later.

Figure 5:
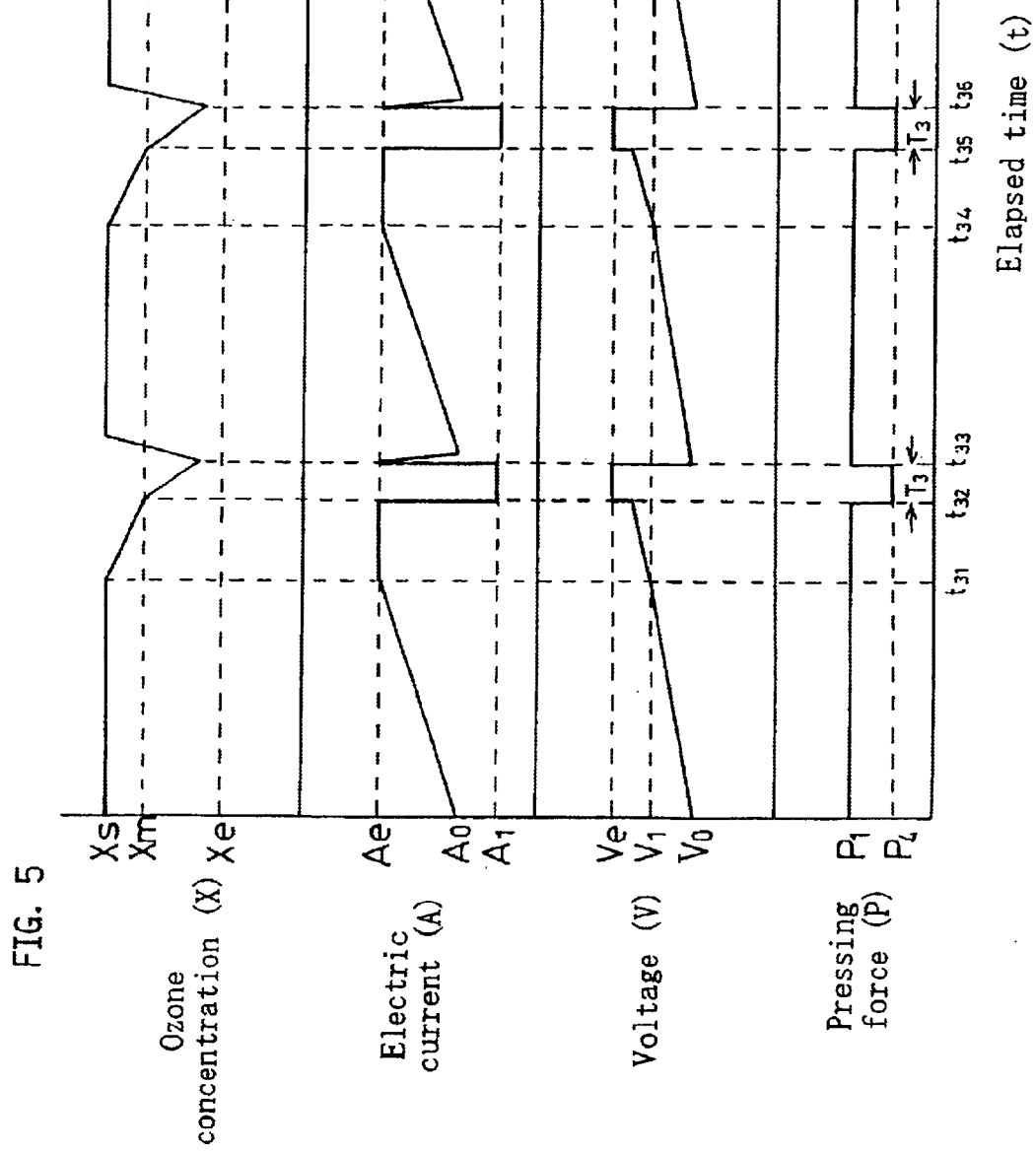
FIG. 5 shows a running time chart in a furthermore other embodiment concerning the first method of the present invention.

Next, FIG. 5 shows a running time chart as to another embodiment of the present invention. While the running is continued to be controlled so that the concentration of ozone aqua may reaches the predetermined desired value Xs, the current value A rises gradually and reaches the ceiling value Ae allowed by the apparatus at the time 31. When the running is further continued with this state, the concentration of ozone aqua falls down gradually. Therefore, a suitable value Xm is previously set between the permission lower limit value Xe and the specified value Xs. When this preset value Xm is detected (time t32), as similar to the case of FIG. 1, the pressing force of the electrolyte membrane varies from the initial value P1 to the low pressure value P4. Then, this state is kept during the predetermined period until time t 33 (T3). After that, the pressing force returns to the initial value P 1 again. In other words, in the examples of FIG. 1, FIG. 3, FIG. 4, the recovery of the electrolyte membrane is accomplished at every predetermined cycle (Tc) by means of carrying out the operation for changing the pressing force. On the other hand, in the present embodiment, the operation for changing the pressing force P is begun to detect the decrease of the concentration of ozone aqua. In this point, the present embodiment differs from the above mentioned embodiments. But, the recovery of the electrolyte membrane is accomplished by the operation for changing the pressing force P. In this point, the above mentioned embodiments are same as the present embodiment.

Figure 6:
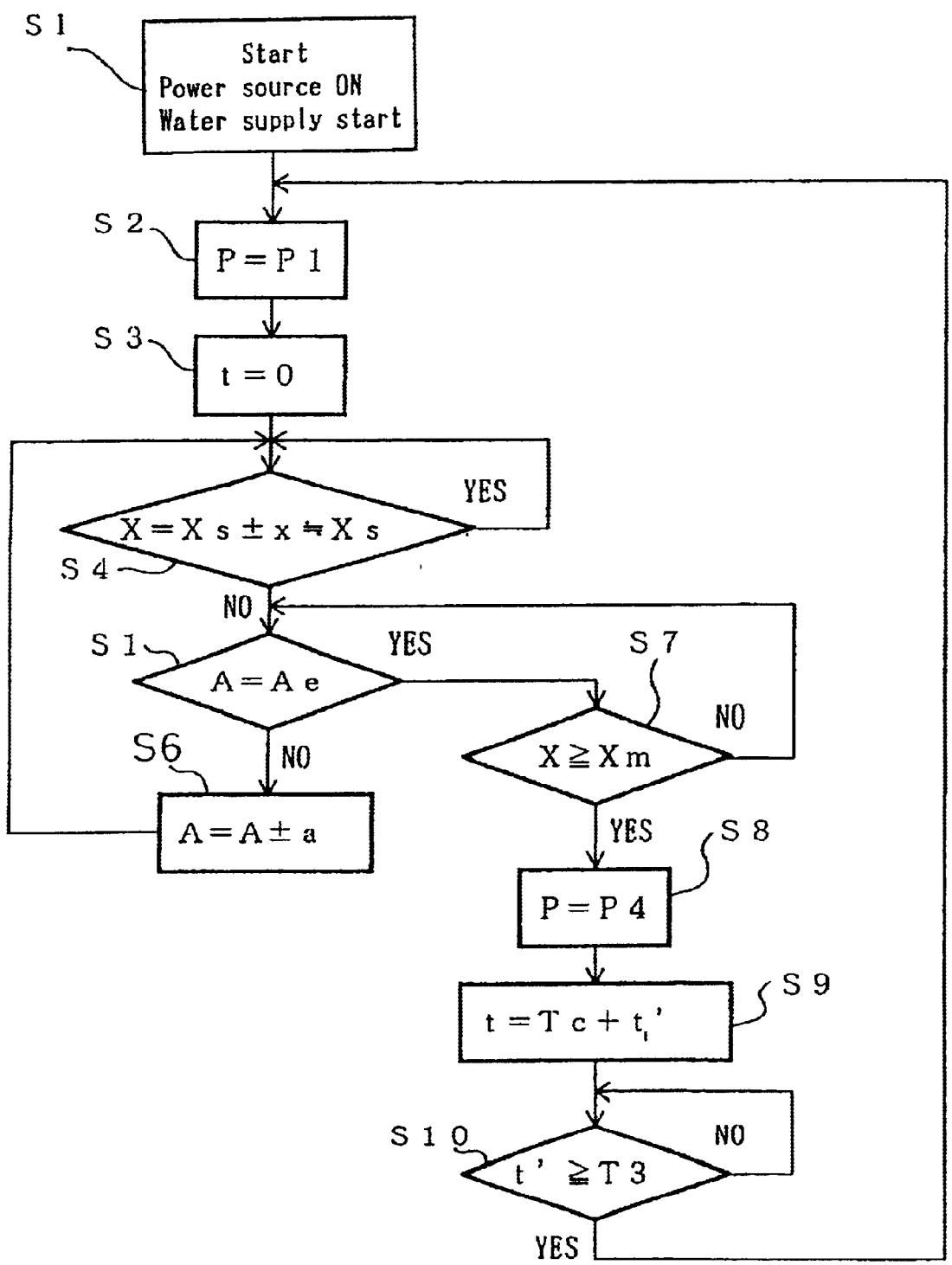
FIG. 6 shows a flow chart in the operation control method of FIG. 5.

FIG. 6 shows a flow chart which realizes this running time chart.

In FIG. 6, the concentration of ozone aqua is controlled so as to become the predetermined value Xs till the current value A reaches the ceiling value Ae of the apparatus. As concerns these points (S1–S4), the present embodiment is the same case of FIG. 2. When the second comparator 88b detects that the current value A has reached the ceiling value Ae (S5, Yes), the concentration of ozone aqua begins decreasing. Accordingly, the concentration detection sensor 84 of ozone aqua detects continuously the decrease condition as concerns the concentration of ozone aqua, When the concentration X of ozone aqua decreases toward and under the preset value Xm for starting controlling the change of the pressing force (S7, Yes), the second command section 88b puts out the instruction for changing the pressing force P to the low value P4 (S8). The third comparator determines whether the elapsed time t' has elapsed by the predetermined period T3 after the pressing force begins changing (S8, S9). When this elapsed time t' fulfills t'≧T3 (S10, Yes), the third comparator outputs the exceeding the signal to the second command section 86a. And, the second command section 86b outputs the signal for setting the pressing force P at the initial value P1 again toward the pressing force controller 81 (Shifting to S2). Then, the running apparatus is continued.

In this method, the V-shaped or U-shaped pattern as shown in FIG. 3 or other pattern can be taken as the pattern for changing the pressing force. Also, in the operation period (T3), it is available that the operation for changing the pressing force with the pulse-shaped pattern is carried out at every minute time Δt and plural times as similarly to the method shown in FIG. 4. Further, in the present embodiment, when it is detected that the concentration of ozone aqua has reached Xm, the operation for changing the pressing force is started.

However, the operation for changing the pressing force may be started at the event when it is detected that the electric current or voltage or a quantity of supply of the material water has reached the predetermined value (There is such a method as the concentration of ozone aqua is recovered by decreasing a quantity of supply of material water when the concentration of ozone aqua decreases.).

Figure 7:
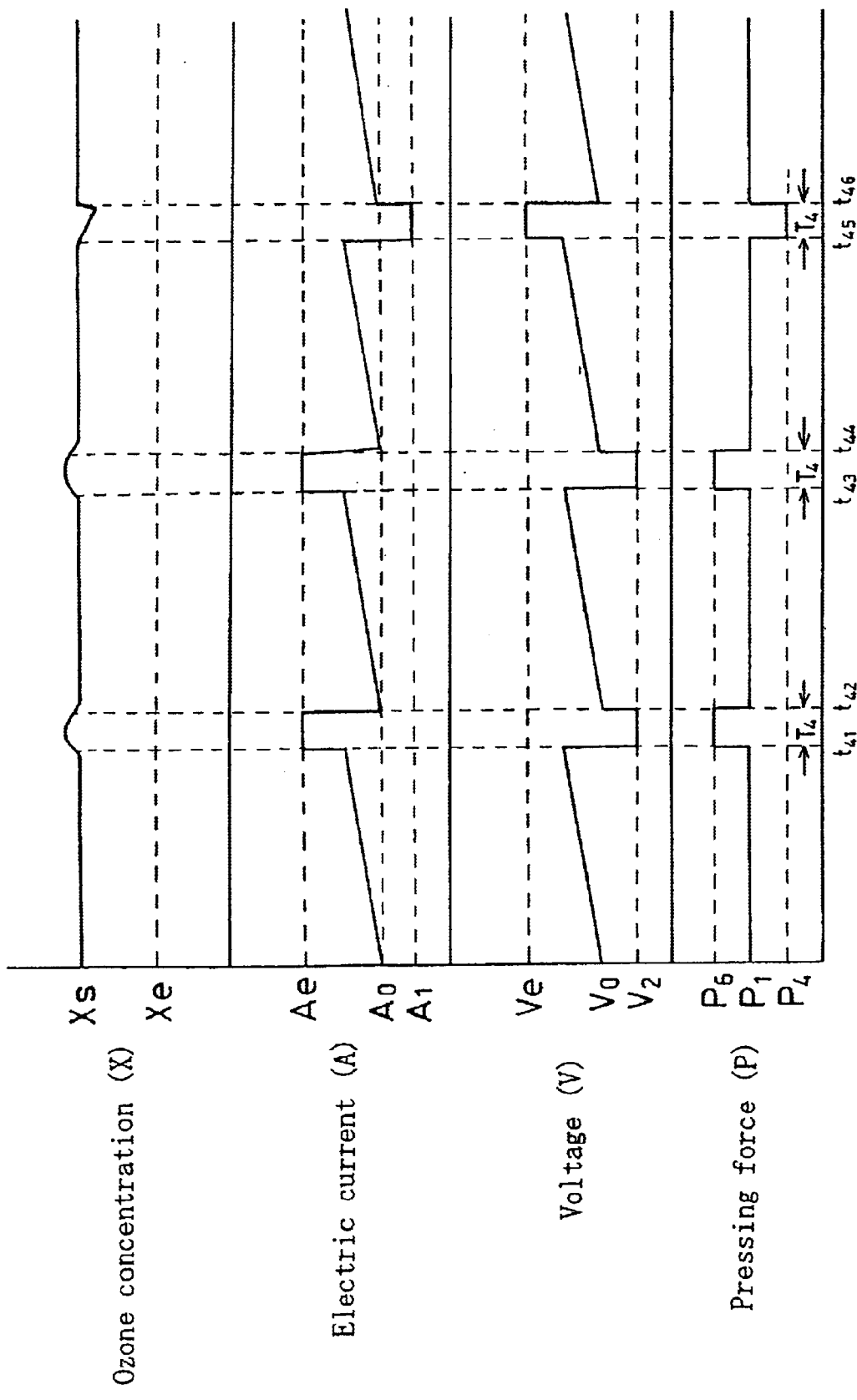
FIG. 7 shows a running time chart in a furthermore other embodiment concerning the first method of the present invention.

Next, FIG. 7 shows a running time chart with regard to another embodiment of the present invention. There is the different point from the method of FIG. 1–FIG. 5 in the operation for changing the pressing force P against the electrolyte membrane. In other words, in the method of FIG. 1, and FIGS. 3–5, the change of the pressing force P is decrease. On the other hand, in the present embodiment, the change of the pressing force P is increase. In detail, in FIG. 7, when the running is performed so that the concentration of ozone water may be maintained at the predetermined value Xs, the current value A increases gradually as previously described. The pressing force of the electrodes against the electrolyte membrane increases from the initial value P1 to the higher value P6 at the suitable time (t41) before the current value A reaches the permission ceiling value Ae of the apparatus. And, the electrolyte membrane is recovered by holding this state during the regular period T4 until the time t 42. In this case, as the contact resistance between the both electrodes and the electrolyte membrane decreases, the current value A rises till the ceiling value Ae, the voltage falls down to the low value V1 conversely and the concentration of ozone water slightly rises for a short time. However, when the pressing force returns to the initial value P1 after the regular period (T4) elapsing, the current value A, the voltage value V and the concentration X of ozone aqua return to the initial values respectively. This operation is repeated with the predetermined cycle.

In addition, in the figure above, the pressing force P falls down from the initial value P1 to the low value P4 at the time t45 in similarly to the case of FIG. 1. After this state is held during the predetermined periods (T4), the pressing force rises to the value P1 again at the time t 46. There are some ways of operation for changing the pressing force as follows in addition to the way of decreasing from the initial value P1 to the low value P4 as above. The way of increasing to the high pressure value P 6, the way of combining with the above described ways appropriately. It is optional which ways is chosen. Besides, as concerns the concrete way of the operation for changing pressing force, there are various kinds of variations, for example, the various kinds of pattern as shown in FIG. 3 and the pulse-shaped pattern as shown in FIG. 4. These patterns can be used respectively or to be combined appropriately.

Figure 8:
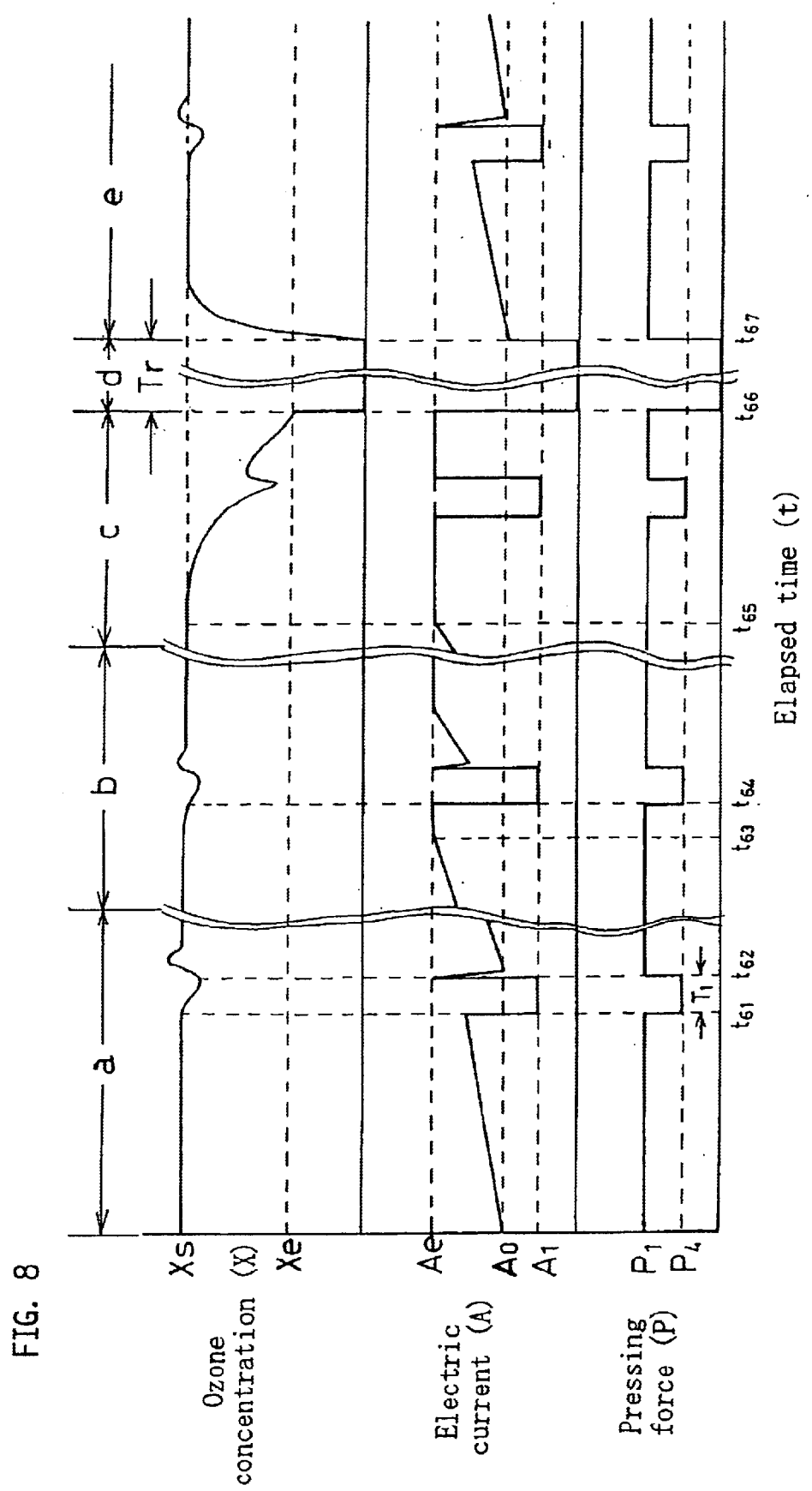
FIG. 8 shows a running time chart in a furthermore other embodiment concerning the first method of the present invention.

Next, treatments will be explained in case that the recovery of the efficiency has reached a limit as a result of that the operation for changing the pressing force is carried out repeatedly and the running continuous for long term. FIG. 8 shows a running time chart in case that the operation for changing the pressing force is repeated and the running apparatus continues by the method as shown in FIG. 1. In FIG. 8, an interval (a) shows a state in normal running, wherein the pressing force decreases from the initial value P1 to the low value P4 with the definite cycle according to mentioning above, and the state is held during the regular period (T1), then the pressing force returns to the initial value P1. This operation is repeated. The concentration X of ozone aqua is always maintained at the desired value Xs.

However, when this running is continued for the long term, the recovery ability of the efficiency of the electrolyte membrane deteriorates gradually, as indicated in an interval (b) of FIG. 8, the current value A reaches the permission ceiling value Ae of the apparatus before the elapsed time reaches the time t64 at which the operate for decreasing the pressing force begins.

When this state continues further, as indicated in an interval (C) of FIG. 8, the current value reaches the ceiling value Ae at time t 65, also the concentration of ozone aqua begins deteriorating from this time point then the recovering the function of the electrolyte membrane will not be enough even if the operation for changing the pressing force P is carried out.

Therefore, the current value A does not decrease from the ceiling value Ae and the tendency of the ozone aqua concentration to decrease continues. Finally, the concentration of ozone aqua reaches the lower limit value Xe at the time t66. In such a state, it is meaningless to continue the operation for recovering the electrolyte membrane by changing the pressing force P.

At this time, in the present invention, there are three ways to be taken. The first way is a way wherein the electrolyte membrane is exchanged after the apparatus is stopped and disassembled. The second way is a way shown in Japanese Patent Laid-Open No. 11-172482 wherein it is waited that the membrane function recovers after the apparatus is stopped and the working of the electrolyte membrane is stopped. The third way is shown in PCT/JP98/5576 wherein the pressing force to the electrolyte membrane increases and a membrane is revitalized. Hereon, the second and the third way will be described. A detailed description about the first way is omitted because the electrolyte membrane is only exchanged in the first way.

Figure 9:
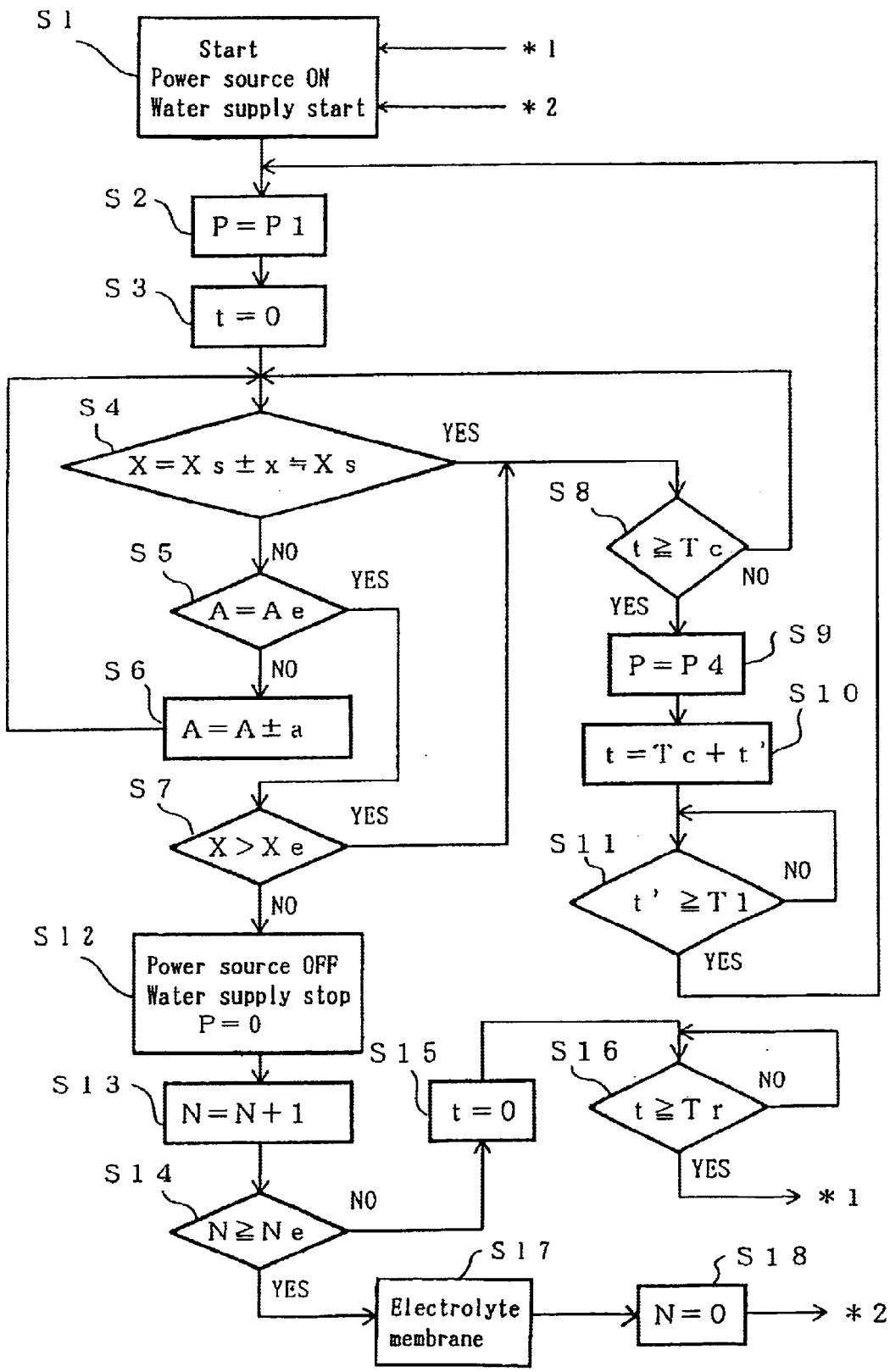
FIG. 9 shows a flow chart in an operation control method of FIG. 8.

At first, the second way will be explained by using FIG. 9. The S1–S6 is similar to the case of FIG. 6. So, the explanation is omitted. In the state (b) of FIG. 8 (S5), the current value A reaches the ceiling value (A=Ae) (S5, Yes) on the way of the change cycle of the pressing force. In this case, the judgment shifts from the second comparator 88b to the first comparator 88*a*, there, it is determined whether the concentration X of ozone aqua does not reach the lower limit value Xe (S7).

And, when the current value A reaches the ceiling value Ae and the concentration X of ozone aqua does not reach the lower limit value Xe (S7, Yes), it is determined at the third comparator 88*c* whether the time reaches the repetition cycle Tc with regard to the change of the pressing force P (S8). In S8, when the condition $t \geq Tc$ is fulfilled (S 8, Yes), the pressing force P shifts to the low value P4 (S9) similarly to S7 shown in FIG. 2, and the measurement of the elapsed time t' is begun (S10) by the timer 87 similarly to S8 in FIG. 2 after starting the change as to the pressing force P. And, this state is maintained (S11) similarly to S9 in FIG. 2 during the predetermined period set previously (T1). When the condition $t' \geq T1$ is fulfilled (S11, Yes), the pressing force P is returned to the initial value again and the running is continued (Shift to S2).

Figure 20:
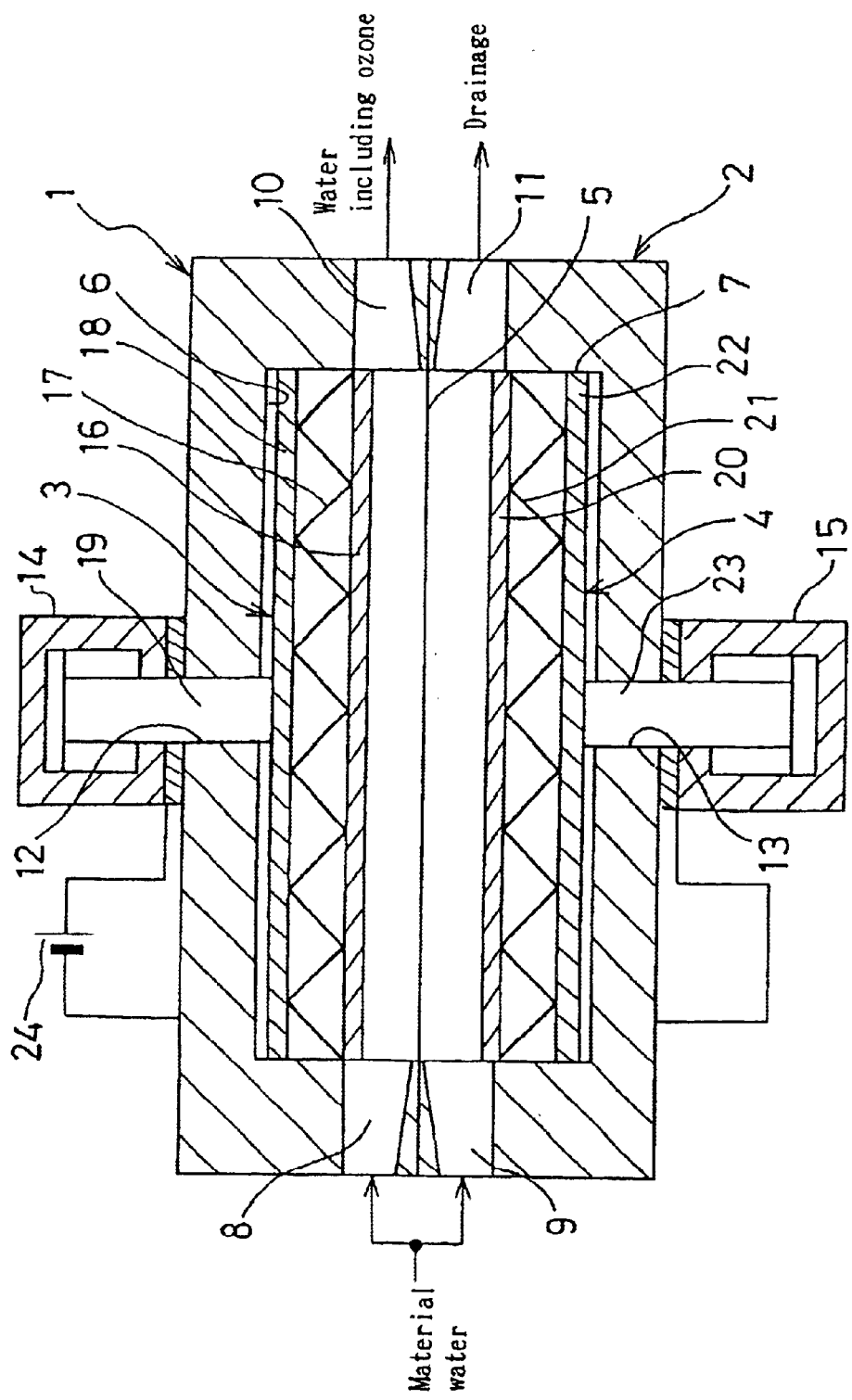
FIG. 20 shows a feature section of recovery state of a solid polymer electrolyte membrane according to a conventional apparatus of FIG. 19.

Next, when the state reaches the state (c) of FIG. 8(*c*) (S5), the concentration X of ozone aqua decreases gradually after the current value A reaches the ceiling value Ae. And, when the concentration X of ozone aqua is less than the lower limit value Xe (S 7, No), the signal from the first comparator 86*a* is sent to the third command section 86*c*. Here, the power source is set to OFF, also the supply of material water stops (an interval d of FIG. 8), and the anodic electrode 3 and the cathode electrode 4 are kept apart from the electrolyte membrane 5 as indicated in FIG. 20, then the run of the apparatus stops (S12). This stop process is equivalent to the membrane recovery process described in an above-mentioned Japanese Patent Laid-Open No. 11-172482, wherein, the work of the electrolyte membrane 5 is stopped and the recovery as to the function of electrolyte membrane 5 is carried out. The stop frequency N about the run is counted by the stop frequency count part 90 (S13). It is judged whether the stop frequency reaches the predetermined frequency Ne in the fourth comparator 88*d*. When the stop frequency does not reach the predetermined frequency Ne (S14, No), the judgment is continued (S16, No) at the third comparator 88*c* until the stopping time t elapses by the predetermined stop period Tr. When the predetermined stop period Tr elapses (S16, Yes), the elapsed signal is be transmitted to the third command section 86*c* then, the run of the apparatus is started (an interval e of FIG. 8, Shift to S1).

In the stop period Tr of the above apparatus, the pressing force to the electrolyte membrane is completely released. In this interval, the impurities etc. which have accumulated in the electrolyte membrane by the pressing force, are given off, then the membrane recovers. As this stop period Tr, the time is necessary at least more than 30 minutes. It is preferable about 3–12 hours. When the function of the electrolyte membrane has recovered in this stop period, the electrolyte membrane is pressed again by the both electrodes from the time t67 with the initial value P1 as shown in the interval (e) of FIG. 8. And the supplies of the material water and the electricity are begun again. When the running is carried out again with the operating condition in conformity to the initial setting, the current value A starts from the initial value A0 in similar to the case of FIG. 1. The concentration X of ozone aqua reaches the predetermined value Xs immediately. Afterward, as shown in FIG. 1, the operation for changing the pressing force is repeated and the running is continued. And, when the efficiency of the electrolyte membrane deteriorates again and the predetermined concentration of ozone aqua is not provided, the recovery operation of the membrane function is carried out by stopping the run again and releasing the pressing force to the electrolyte membrane according to the statement above. Afterward, such the operation is repeated as well, finally, the recovery of the membrane function cannot be expected. Therefore, It is judged whether the stop frequency N reaches the predetermined frequency Ne in the fourth comparator 88*d*. The stop frequency N is counted in the stop frequency count part 90 until then (In other words, the recovery frequency of the electrolyte membrane by stopping the run of the apparatus). When the stop frequency N reaches the predetermined frequency Ne (S14, Yes), the electrolyte membrane is exchanged as prior (S17). And, the stop frequency N is reset to zero (N=0) (S 18).

Figure 10:
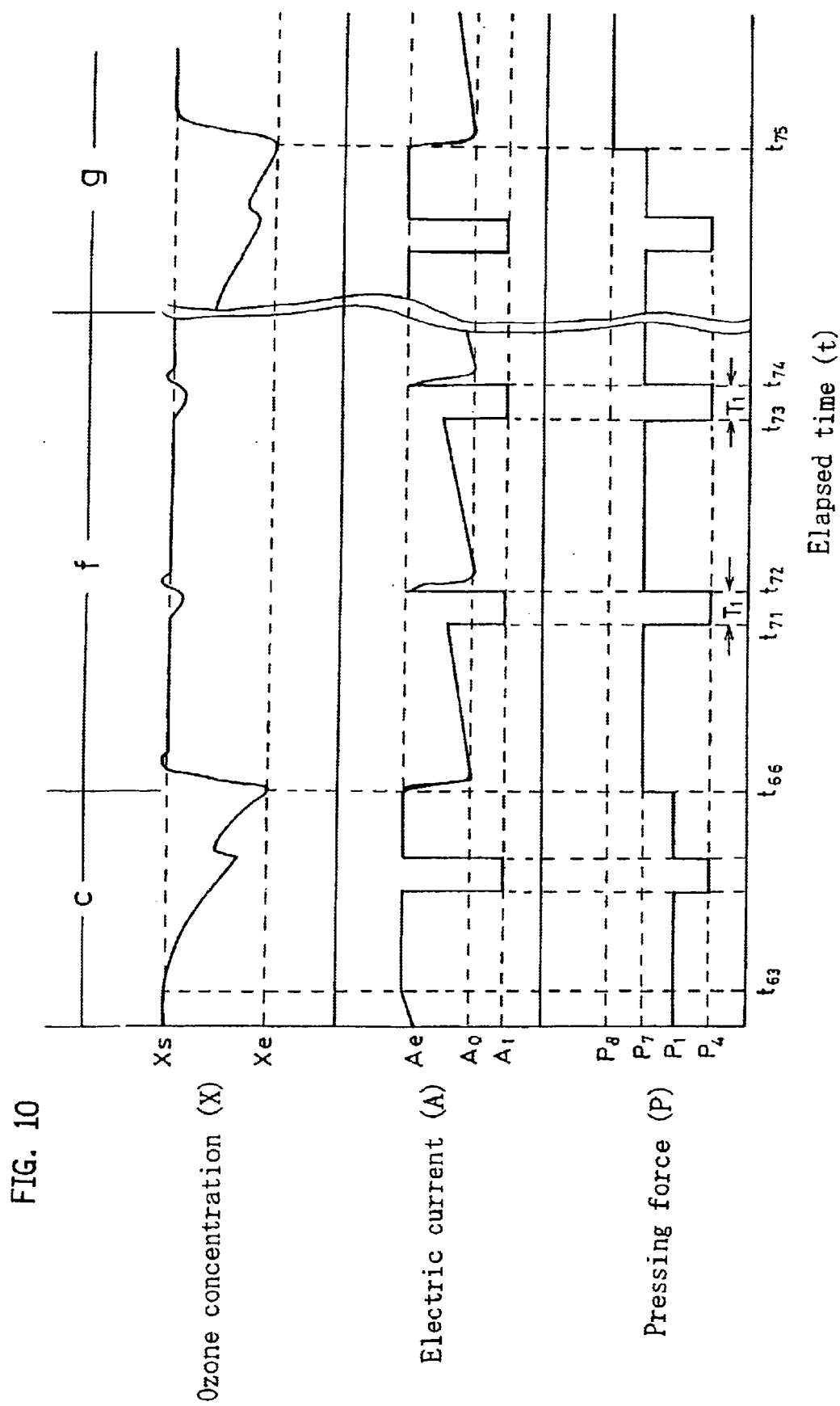
FIG. 10 shows a running time chart in a furthermore other embodiment concerning the first method of the present invention.

Next, the third above way will be explained by using FIG. 10. The way of FIG. 10 is also one example of the way in which the operation for changing the pressing force of FIG. 1 is carried out. An interval (c) in FIG. 10 is the same as the interval (c) of FIG. 8. Even if the operation for changing the pressing force is carried out, the membrane function will not recover. At the time t 66, the concentration X of ozone aqua reaches the lower limit value Xe. In this the third way, when it is detected that the concentration X of ozone aqua reaches the lower limit value Xe, the pressing force P rises to the higher pressure value P7 from the initial value P1. Then, the operation shifts to an operation with a new pressing force condition (an interval f). By rising this pressing force P, an area contacting the electrolyte membrane with the both electrodes becomes large and the contact resistance becomes small. At the same time, the function area of the membrane increases and the membrane ability increases. As a result, the concentration X of ozone aqua recovers gradually and returns to the predetermined value Xs. On the other hand, also the current value A returns to the original value A0 gradually. Afterward, in similar to the case FIG. 1, at the time t71, the pressing force P decreases from the specified value P7 to the low value P4. This low value is kept during the period T1, then the pressing force returns to the predetermined value P7 at the time t 72 again. And this operation is periodically repeated.

The running is continued under the condition of this pressing force P7, and then, when the reduction of membrane function cannot recover enough by the operation for changing the pressing force P as shown in an interval (g), the concentration X of ozone aqua reaches the lower limit value Xe (period t75). The pressing force P is again set from P7 to a further higher value P8 to detect this. From a time when the pressing force is again set from P7 to the further high P8, in similar to the description about the interval (f), the ozone aqua is continuously produced with the predetermined concentration to recover the membrane function. Afterward, the similar operation is continued in turn till the pressing force reaches the highest predetermined value.

When the concentration of ozone aqua decreases after the pressing force reaches the highest setting value, as indicated in the above mentioned FIG. 8, the run of the apparatus is stopped. And, the both electrodes are kept apart from the electrolyte membrane, the stress which is accumulated in the membrane is released. In this manner, the recovery treatment of the membrane is carried out. After that, the running begins again under the condition of the pressing force P1, or the electrolyte membrane is exchanged.

In the description until now, the pattern of the operation for changing the pressing force in FIG. 1 has been explained as an example. Also the another patterns such as shown in above mentioned FIGS. 3–5 and FIG. 7 can be applied as a pattern of the operation for changing the pressing force.

As mentioned above, in the present invention, the pressing force P of the electrodes as against the electrolyte membrane is changed then after the change, the state is kept for the predetermined period. Thereby, the recovery of the electrolyte membrane is carried out. However, the recovery principle is not clear. the following hypotheses are conceived. The first hypothesis is given as follows. Ions and ion clusters deteriorate the membraneous ability to accumulate in the electrolyte membrane as the time elapses. In the ions and the ion clusters (aggregate of ion), state-breaks occur by the change of the pressing force. Thereby, the recovery of the membrane function is carried out. In other words, according to this hypothesis, in the electrolyte membrane, an ion pair consisting of fixed charge and ion acts as an electric dipole and a distribution width of negative charge becomes larger than one of positive charge then effective dipole layer is formed on the ion clusters surfaces. It is the reason why the distribution width of negative charge becomes larger than one of positive charge that asymmetry forces act between the negative fixed charges by the arrangement energy of polymer chain. When ions transfer among clusters by jumping, the ions must be over potential barrier which the dipole layers make. This potential barrier becomes large as size or number of ion clusters becomes large, and the number and size of ion clusters in the electrolyte membrane become large as time elapses. Therefore, it is inferred that transmission barrier against ions become large as the time elapses. Especially, a lot of impurities are contained in well water or city water used for producing ozone aqua, so, when they are electrolyzed, the ions having various potentials transmit through the membrane. And it is inferred that, the ions easy to transmit and the ions hard to transmit, simultaneously act on the electrolyte membrane, so that, the ion clusters are accumulated in the membrane, then, as the whole, the transmittable area becomes small gradually as the time elapses. And it is inferred that, in this state, a physical shock is given to the membrane by changing the pressing force then equilibrium state of ion clusters are damaged, so that, the membrane function revives.

On the other hand, the second hypothesis is given as follows. The change of the pressing force is given to the electrolyte membrane in which the transmission resistance of the ions are increased by the polarization effect. Thereby, cancellations of the polarization states are carried out. In other words, in this hypothesis, when the water electrolysis is carried out, hydrogen ions transmit through the cathode side. But, because of the a poor solubility, the hydrogen ions become hydrogen moleculars by ionic bond then fall in gas phase. As the part, through which the hydrogen ions transmit, is extremely small, the generated gas becomes extremely minute bubble. And it is inferred that hydrogens in the state of minute bubble stick to portions contacting the membrane with the electrodes and a state is built up as if hydrogen membrane was formed. This phenomena resembles a phenomena called as polarization effect in the field of battery. As it is difficult for the minute bubbles of hydrogens to exfoliate by such physical impact as a stream, the resistance increases gradually and the membraneous ability deteriorates. And it is inferred that, the minute bubbles of hydrogens are removed by the operation for changing pressing force, then the membraneous ability recovers from that state.

In addition, it has been confirmed that the decrease change is preferable in the operation for changing the pressing force. According to a resultant of an experiment by present inventors, as concerns the time keeping the state after the change of the pressing force, even if the keeping time after the decrease change was shorter than one after the increase change, the function recovery of the electrolyte membrane would be recognized.

Besides, by repeating the operation for changing the pressing force as shown in FIG. 1 in the running state, the present inventors succeeds in realizing a long term continuous running equal to or more than one month. The long term continuous running was conventionally impossible. This data means that, an operation rate is virtually made a perfect operation rate near to 100% by means of repeating run and stop. Conventionally, the operation rate of the electrolysis type ozone aqua production apparatus was substantially about 50%. This method is an epoch-making method which makes unit of ozone aqua reduce to half.

Next, the second method of the present invention will be explained. The first method is a method wherein the recovery of the membrane function is carried out by changing the pressing force from the electrodes to the electrolyte membrane. On the other hand, in the second method, instead of the changing the pressing force, an operation for changing a current or voltage value is carried out.

Figure 11:
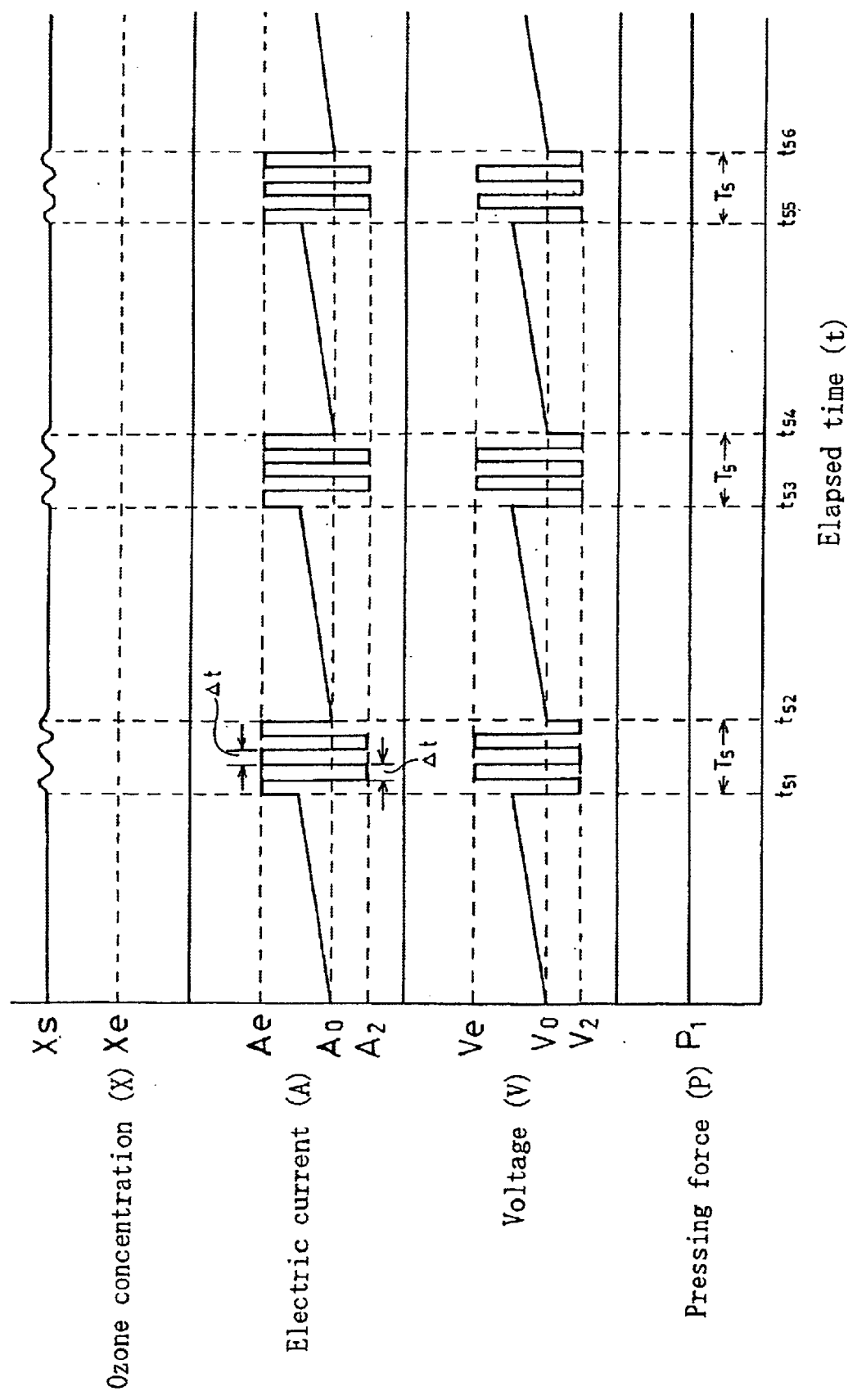
FIG. 11 shows a running time chart in an embodiment concerning the second method of the present invention.

FIG. 11 shows a running time chart concerning this second method. When the apparatus runs to control the electric current so that the concentration X of ozone aqua may be maintained at the predetermined desired value Xs, the current value A rises gradually according to the mentioning above. Therefore, the operation is started at the suitable time (time t51) before the current value A reaches the permission ceiling value Ae of the apparatus and carried out during a predetermined period (T5) from the time 51 to the time t52, which changes the current value A between a permission maximum value Ae and a low current value A2 with pulses-shaped pattern. In this case, the voltage V varies between a low voltage value V2 and a permission maximum voltage value Ve of an apparatus with pulses-shaped pattern in reversibly to the change of the electric current A. On the other hand, as to the concentration X of ozone aqua, only the slight change occurs and the big change does not occur. This pulse-shaped electric current change is repeated with plural times in a predetermined period (T5), the maximum value Ae and the minimum value A2 are maintained during a minute time ($\Delta t$) respectively.

In this method, it is inferred that the membrane function of the electrolyte membrane 5 recovers to shatter the various ions or ion clusters accumulated in the membrane or the hydrogen minute bubbles generated between the membrane and the electrodes by means of electric shocks. The various ions, ion clusters or the hydrogen minute bubbles are caused from pressing the electrolyte membrane 5 continuously with the predetermined pressing force P1 as mentioned above.

In addition, as operations for varying the electric current, there are some following methods. The method for changing the electric current with pulse-shape pattern for the predetermined time T5 such as shown in FIG. 11. A method in which the current value changes into a low current value then the state is held for a regular time, after that, the current value changes into a high current value then the state is held for another regular time. In contrasting, a method in which a current value changes into a high current value then the state is held for a regular time, after that, the current value changes to a low current value then the state is held for another regular time. Regarding operations for changing the electric current, it is optionally determined which method is employed in above methods. Also, regarding the change of waveform, there are waveform patterns as shown in 1, 3–5, 7 which have been already used in the examples of the operations for changing the pressing force. The selection can be optional. The above description shows the case of changing the current value. Besides, even if the voltage is changed, the similar resultant will be provided.

Further, this second method can be used together with the method for changing the pressing force P of the electrodes against the electrolyte membrane 5. As concerns the method of FIG. 11, when the pressing force P turns from the initial value P1 into the low value P 4 during the period T5 for changing the electric current, the time chart in FIG. 11 becomes the similar one to FIG. 1 as showing the embodiment of the first above-mentioned method.

Additionally, in this second method, when the recovery of the electrolyte membrane 5 by means of the change of the electric current A or the voltage V reaches the limit, the various kinds of methods can be adopted such as follows.

1) The method of exchanging the electrolyte membrane to stop the apparatus.

2) The method explained in FIG. 8, in other words, the method in which, after the membrane is recovered to stop the apparatus and release the pressing force P of the electrodes 3,4 against the electrolyte membrane, the running is started again.

3) The method explained in FIG. 10, in other words, the method in which the revitalization of the membrane function is performed to raise the pressing force P against the electrolyte membrane step-by-step as function of electrolyte membrane deteriorates.

As mentioned above, in the first method, it is required that the employed ozone aqua production apparatus has a structure in which the anodic electrode 3, the cathode electrode 4 or the both electrodes can advance or retreat against the electrolyte membrane 5. There is the apparatus of FIG. 21 as an example of the ozone aqua production apparatus employed in the first method, However, the apparatus employed in the present invention is not limited to this. Therefore, the other optional ozone aqua production apparatus can be employed, which comprises the mechanism for advancing or reversing the electrodes. As concerns the ozone aqua production apparatus which comprises the mechanism for advancing or reversing the electrodes, other embodiment will be explained as follows.

Figure 12:
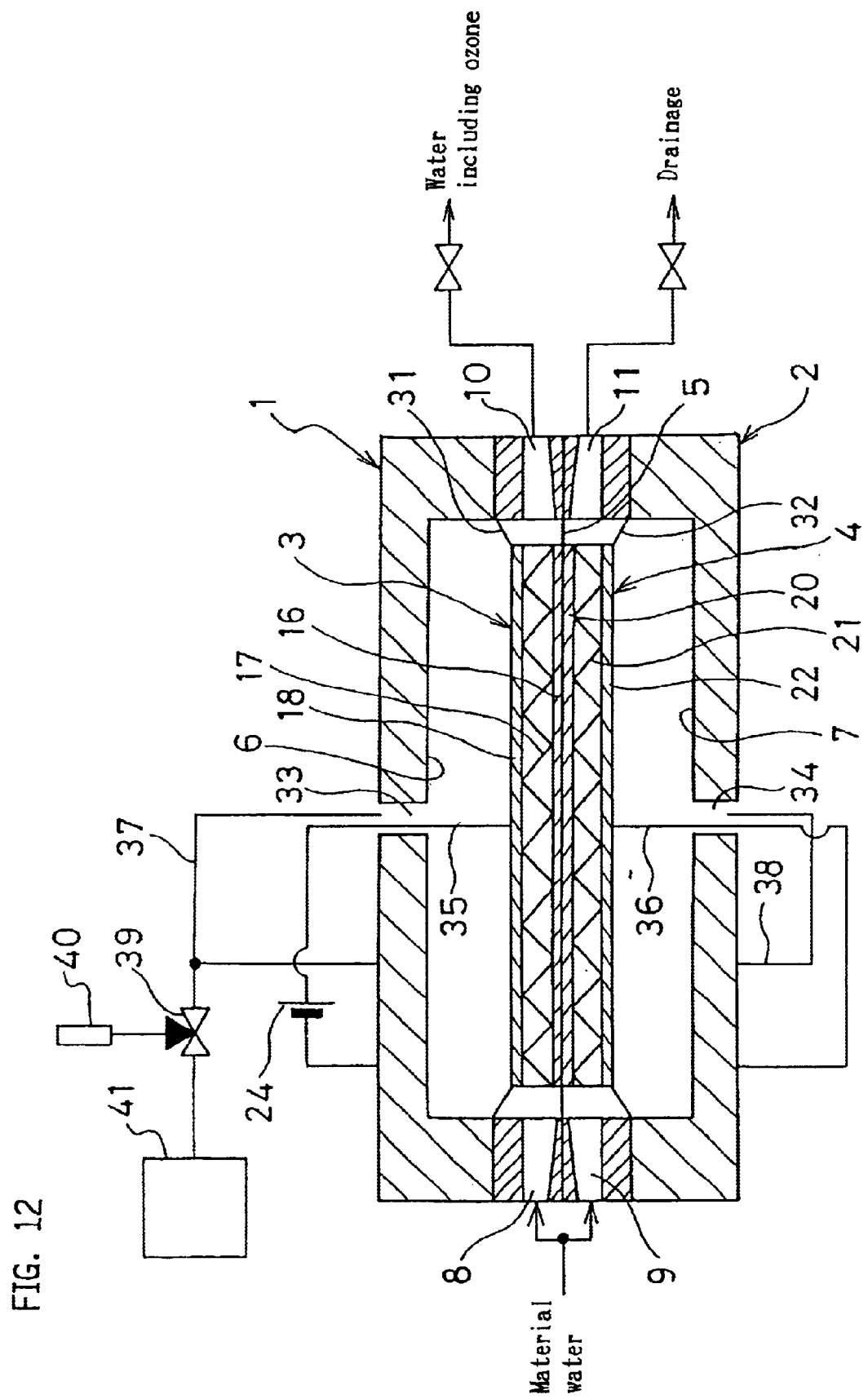
FIG. 12 shows a feature section of an electrolysis type ozone aqua production apparatus in an embodiment of the present invention.

FIG. 12 shows a feature section of the example ozone aqua production apparatus which comprises the mechanism for advancing or reversing the electrodes. The electrolyte membrane 5 are arranged between the anode side casing 1 and the cathode side casing 2. The anodic electrode has a corrosion resistance as against ozone. Thereby, the anode chamber 6 and the cathode chamber 7 are respectively formed in anode side casing 1 and the cathode side casing 2. The anodic electrode 3, which is provided with noble metals 16 having a catalyst function for generating ozone, is pressed onto one face of the electrolyte membrane 5 at the anode chamber side so as to be in contact each other. Additionally, the cathode electrode 4, which is provided with a contact face having noble metals 20, is pressed onto another face of the electrolyte membrane 5 at the cathode chamber 7 side so as to be in contact each other. The inflow openings 8,9 and outflow openings 10,11 of material water are formed by each of the anode chamber 6 and the cathode chamber 7. DC voltage is applied between the both electrodes 3,4 by means of a direct-current power source 24 and electricity members 35,36. Additionally, an elastic rubber membrane 31 is arranged between a back face of an electrode plate 18 of the anodic electrode 3 and anode side casing 1. Thereby, the anode chamber 6 is made sealed. On the other hand, an elastic rubber membrane 32 is arranged between a back face of the cathode electrode 4 and the cathode side casing 2. Thus, the cathode chamber 7 is also made sealed. Air pressure or hydraulic pressure can be supplied from a pressure resource 41 to the anode chamber 6 and the cathode chamber 7 by means of pipes 37,38 connected with through-holes 33,34.

The anodic electrode 3 and the cathode electrode 4 advance toward the electrolyte membrane 5 by air pressure or hydraulic pressure respectively when the air pressure or the hydraulic pressure is supplied from the pressure resource 41 to the anode chamber 6 through the switch valve 39 and the pipe 37, and to the cathode chamber 7 through the a pipe 38. And then, the electrolyte membrane 5 is pressed at both sides. Operations for lowering the pressing forces of the both electrodes 3,4 against the electrolyte membrane 5 are carried out as follows. The pipes 37,38 are connected with the vent pipe 40 to control the switch valve 39. The hydraulic pressure or the air pressure in the anode chamber 6 and the cathode chamber 7 is ejected from the vent pipe 40. Then, the pressures in both chambers 6,7 fall down and also the pressing force falls down. In addition, the same parts as shown in the apparatus of FIG. 21 can be referred to the same symbol as shown in the apparatus of FIG. 21. So the detailed description has been omitted.

Figure 13:
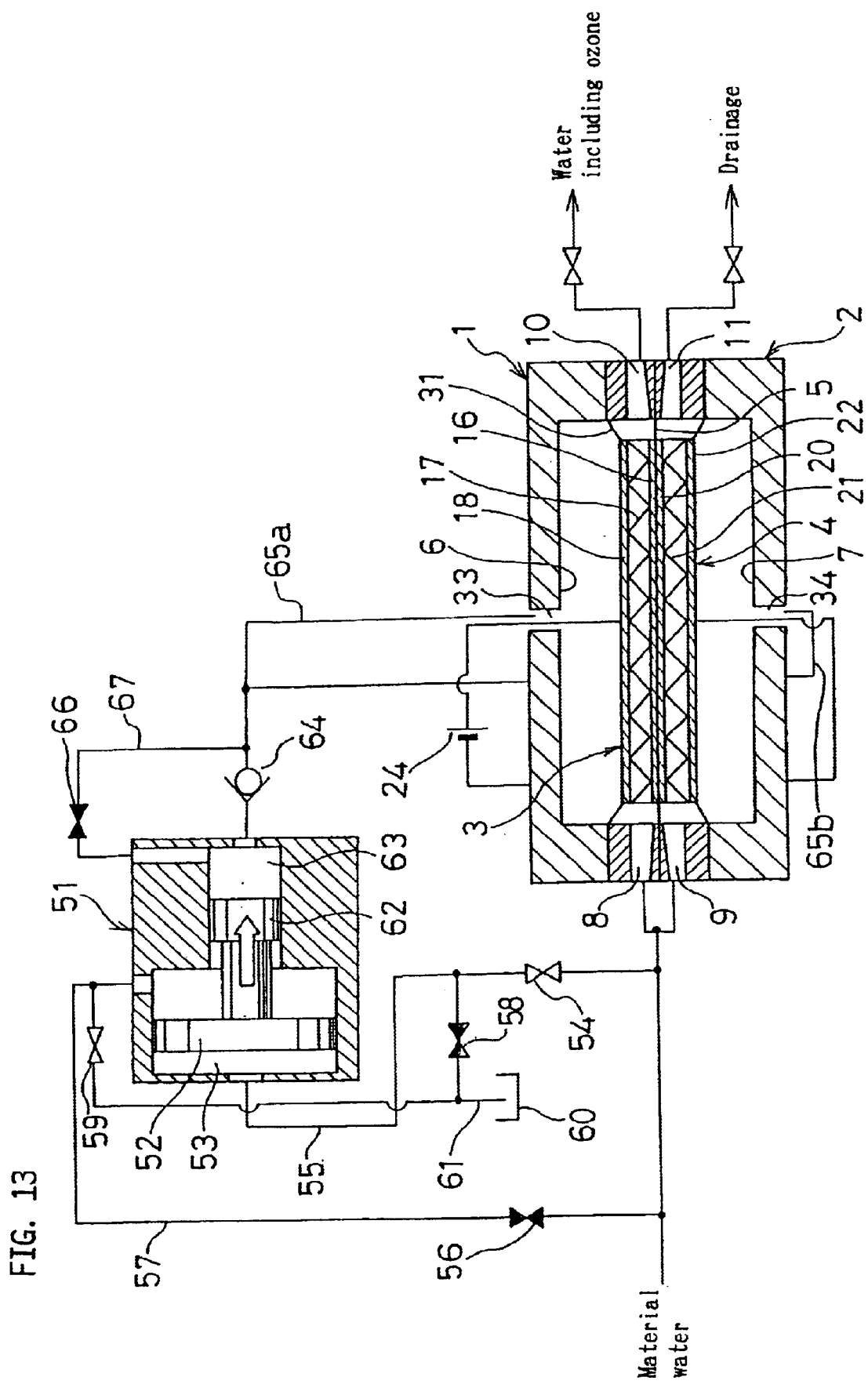
FIG. 13 shows a feature section of an electrolysis type ozone aqua production apparatus in another embodiment of the present invention.

Next, FIG. 13 shows a feature section of other example apparatus having the mechanism for advancing or reversing the electrodes in the present invention. The apparatus of FIG. 12 is one of the example apparatuses with an air compressor. On the other hand, the ozone aqua production apparatus of FIG. 13 is one of the example apparatuses with a hydraulic machine which takes an advantage of material water. The ozone aqua production apparatus of FIG. 13 is basically same as the apparatus of FIG. 12 except that a hydraulic machine 51 is employed instead of the pressure resource 41 of FIG. 12. The same constitution as FIG. 12 can be referred to the same symbol in FIG. 12. So, an overlapping description has been omitted.

In FIG. 13, a pipe 55 which is branched off a material water pipe, is connected to the hydraulic machine 51 at the positive pressure side of a cylinder chamber 53 of a large diameter piston 52. The pipe has a solenoid valve 54 on the way. On the other hand, a pipe 57 which is branched off a material water pipe, is also connected to the hydraulic machine 51 at the back pressure side. The pipe 57 also has a solenoid valve 56 on the way. Additionally, a drain pipe 61 is arranged between the solenoid valves 54,56 and the hydraulic machine 51, which lead to a drainage 60 through another solenoid valves 58,59. Further, at the positive pressure side of the cylinder chamber 63 of a small diameter piston 62, the pipes 65a, 65b are respectively connected to through-holes 33,34 of the anode chamber 6 and the cathode chamber 7 through non-return valve 64. In a bypassing circuit 67 on the non-return valve 64, a solenoid valve 66 is arranged.

Next, the run of this apparatus will be explained. At first, material water is supplied in a state in which the solenoid valves 54,59 are opened while the solenoid valves 56,58,66 are closed. Then, material water is supplied into the positive pressure side of the large diameter piston 52 of the hydraulic machine 51 through the solenoid valve 54 and the pipe 55. And, at the back pressure side of the large diameter cylinder chamber 53, the water is drained through the solenoid valve 59 and the pipe 61. Then, the large diameter piston 52 advances and increases the pressure of the pressure medium (water is preferable) in the small diameter cylinder chamber 63. The pressure medium is supplied from the pipes 65a, 65b to the anode chamber 6 and the cathode chamber 7 through the non-return valve 64. And then, both electrodes advance by the back pressure and presses the electrolyte membrane 5 on the both sides. This pressing force is adjusted to change an opening degree of the solenoid valve 54. In this state, the material water flows in the apparatus through the inflow openings 8,9, then flows out at the outflow openings 10,11 through the passage consisted of lath nets 17,21. Accordingly, when both electrodes 3,4 are applied an electric current from the direct-current power source 24, ozone aqua generates at the anode side by the water electrolysis, then the ozone aqua flows out from the outflow opening 10. When predetermined time elapses, the solenoid valve 54 is closed and the solenoid valve 58 is opened. Then, the hydraulic pressure against the large diameter cylinder chamber 53 by material water is released. The large diameter chamber cylinder 53 is opened toward the drainage 60 by through the pipes 55 and the solenoid valve 58. As a result, the pressure of the small diameter cylinder chamber 63 is also released. And the pressures acting on the anode chamber 6 and the cathode chamber 7 fall down. Then, the pressing force of the anodic electrode 3 and the cathode electrode 4 against the electrolyte membrane 5 falls down. With keeping this condition, after a regular time elapses, the solenoid valve 54 is opened and the solenoid valve 58 is closed as mentioned above, then the electrolyte membrane 5 is pressed by both electrodes 3,4 again. By means of repeating this operation of this solenoid valve requirement times, the above-mentioned operation for changing the pressing force is carried out.

Figure 14:
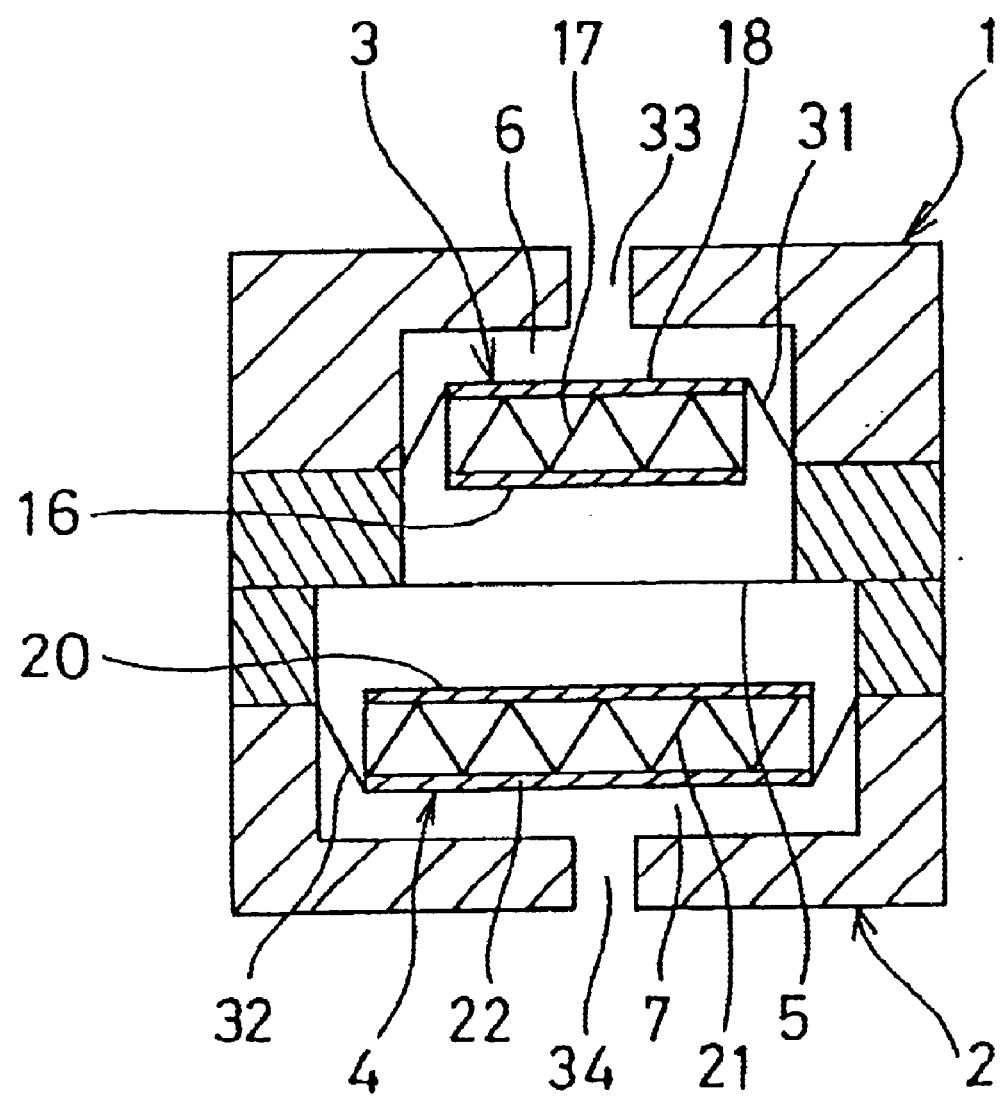
FIG. 14 shows a feature section of an electrolysis type ozone aqua production apparatus in furthermore another embodiment of the present invention.

In addition, in the present invention, as the advance or retreat mechanism of the both electrodes, any kind of types or any kind of structures can be employed. The advance or retreat mechanism of the both electrodes is not limited to the embodiment as mentioned above. Additionally, the shape of the electrodes and the structure are not limited to the embodiment illustrated in drawings. For example, the production efficiency of ozone aqua improves as follows. As illustrated in FIG. 14, as concerns width of the electrode plate, the electrodes are made up so that the anodic electrode 3 may be smaller than the cathode electrode 4. Accordingly, as concerns width of the chamber, the anode chamber 6 is made up so as to be narrower than the cathode chamber 7. In accordance with above structure, the current density at the anodic electrode 3 side becomes higher than one at the cathode electrode 4 side and the production efficiency of ozone aqua can be raised.

Figure 24:
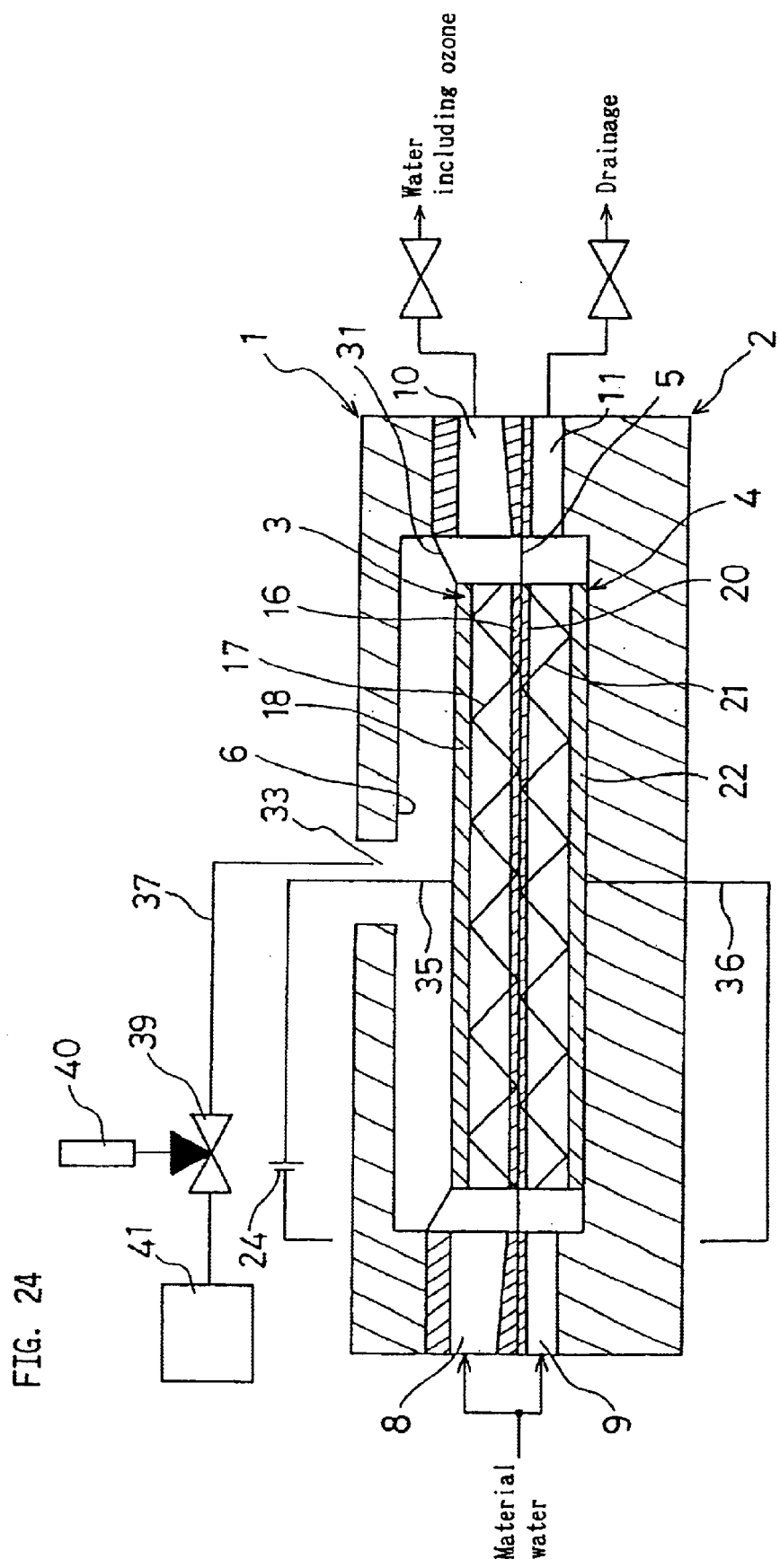
FIG. 24 shows feature section of other example of an electrolysis type ozone aqua production apparatus of the present invention.
Figure 25:
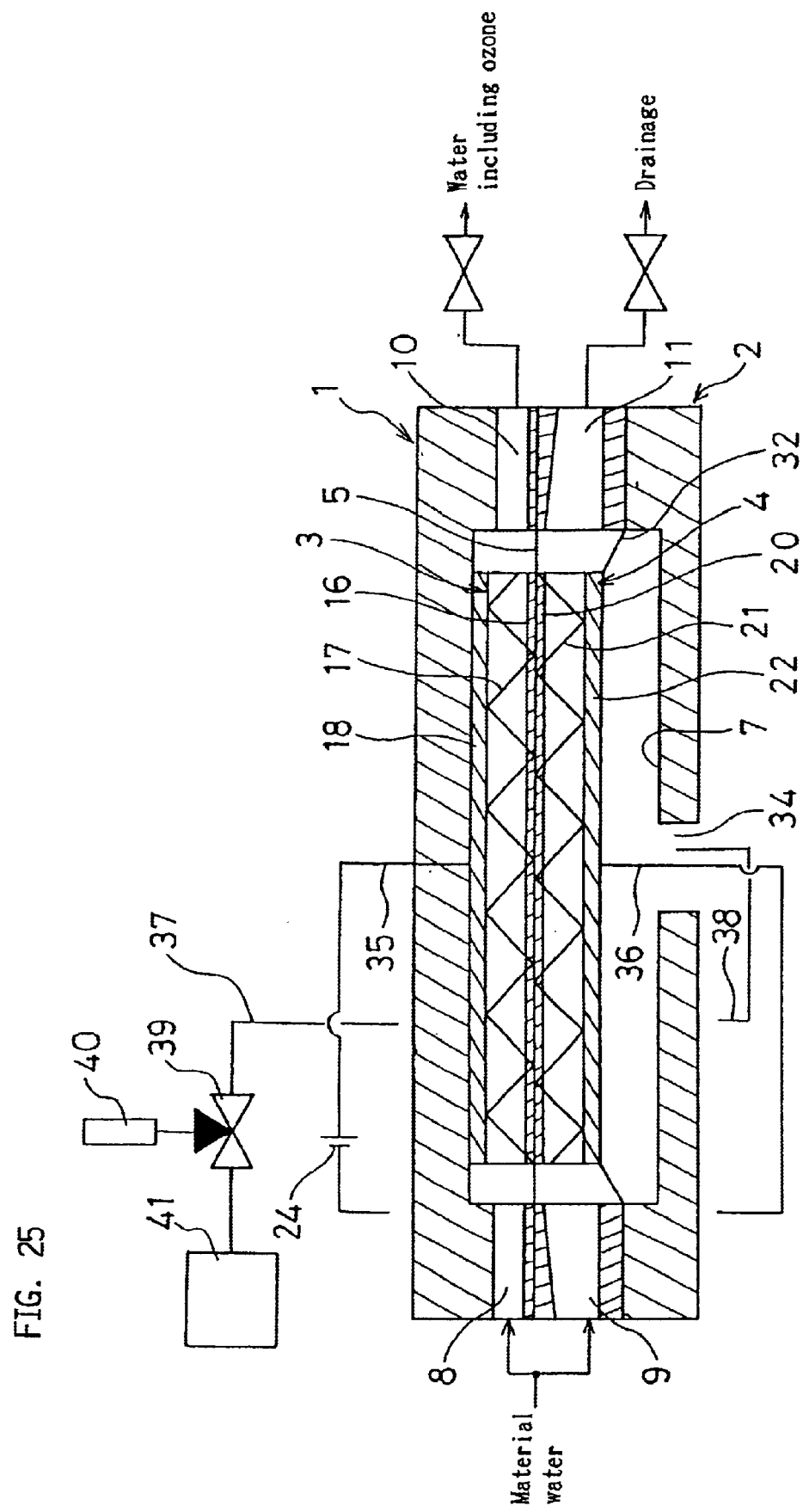
FIG. 25 shows a feature section of furthermore other example of an electrolysis type ozone aqua production apparatus of the present invention.

Additionally, the following other structure can be employed. As shown in FIG. 24, the structure in which only anodic electrode 3 is able to advance or retreat. As shown in FIG. 25, the structure in which only cathode electrode 4 is able to advance or retreat. In addition, in the above mentioned apparatus, the same constitution as in FIG. 14, FIG. 24 or FIG. 25 can be referred to the same symbol in those drawings. So, the detailed description has been omitted.

As discussed above, any shape and any structure of the apparatus can be employed in the present invention when the following condition is fulfilled. The following conditions is that at least one of the electrodes can advance and retreat against the electrolyte membrane and the pressing force of the electrodes against the electrolyte membrane is adjustable by the electrodes. Accordingly, the present invention is not limited to the apparatuses and the methods as shown in the above embodiments.

Additionally, it is clear that the recovery method of the electrolyte membrane of the present invention can be applied as the recovery method about the electrolyte membrane of fuel cell. Because, the constitution of the electrolysis type ozone aqua production apparatus employed in the present invention is basically the same constitution as fuel cell.

EXAMPLE

A concrete example of the present invention will be explained as follows. The examination which produces ozone aqua continuously, has been carried out with using the electrolysis type ozone aqua production apparatus having a constitution in which the anodic and cathode electrodes can is pressed on the electrolyte membrane by means of air pressure or hydraulic pressure as shown in FIG. 12. In addition, the electrolyte membrane used for the examination is a perfluorimated proton exchange membrane. Both anodic and cathode electrodes are made of the plate electrodes of 150 cm². Platina wire nets are respectively loaded on contact faces of the plate electrodes with the electrolyte membrane, which have catalyst function for making generate ozone. On the back faces of the plate electrodes, lath nets made of titanium are arranged. Material water circulates in the lath net portions. The apparatus was run according to the method shown in FIG. 1 on the following operating condition.

Figure 15:
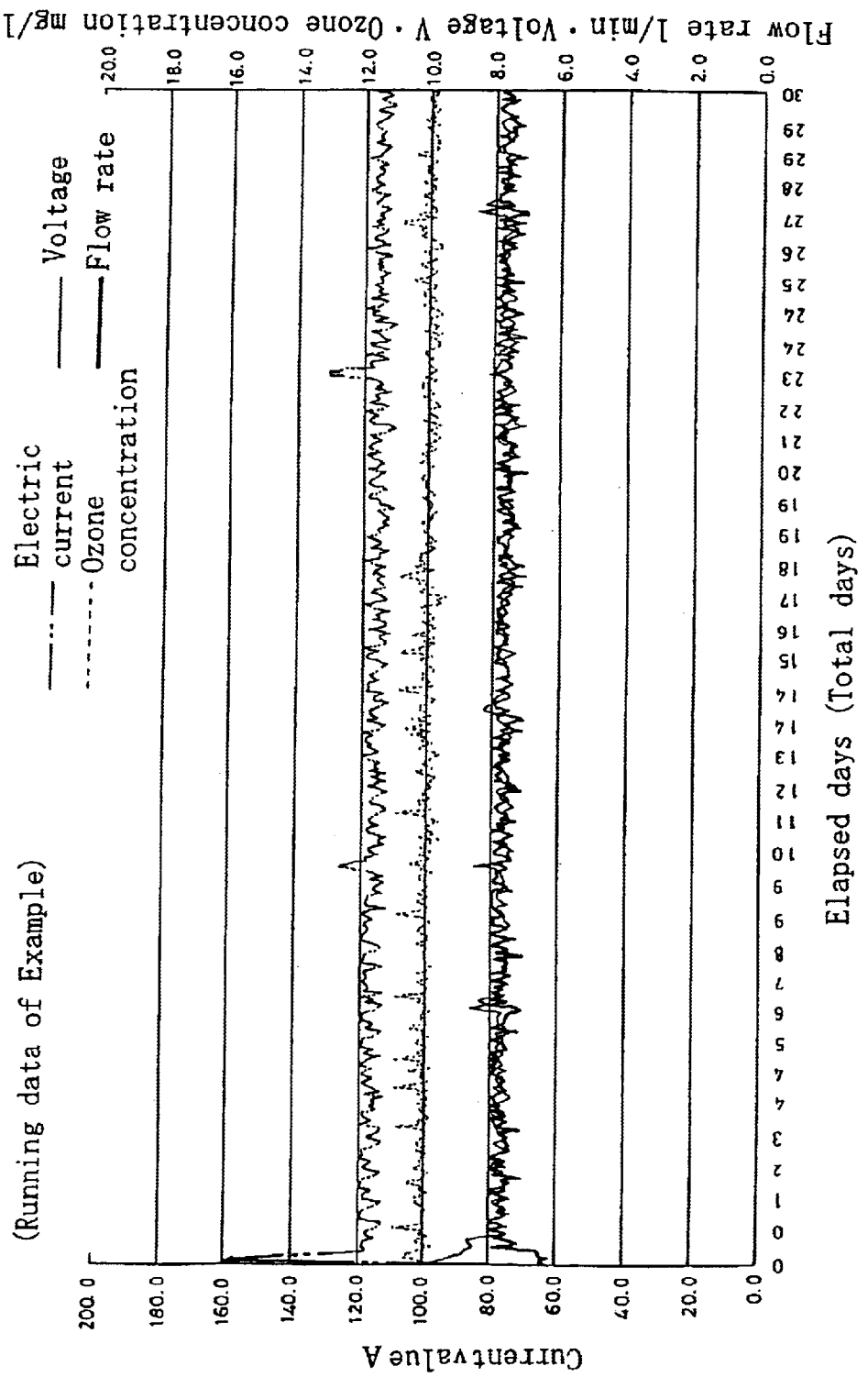
FIG. 15 shows an example of a running time chart in a real running concerning the first method of the present invention.

[Operating Condition]
① Set target ozone aqua concentration: 10 ppm (mg/Liter)
② Initial value of the pressing force against the electrolyte membrane: P1=4 kg f/cm²
③ Low value of the pressing force against the electrolyte membrane: P4=0 kgf/cm² ④ Cycle of the operation for changing the pressing force: Tc=15 minute
⑤ The time which holds the pressing force at the low value pressure: T1=2 second
⑥ Flow rate of ozone aqua: About 8 Liter/minute In this running process, the current value A, the concentration X of ozone aqua, the voltage value V and the flow rate Q of ozone aqua were measured. The result was shown in FIG. 15. The pressing force was changed from 4 kgf/cm² to 0 with 15 minutes cycle and the condition was held for two seconds. However, as is apparent from the figure above, the concentration of ozone aqua hardly changed and it was found the concentration of ozone aqua fell in a range of normal variation. Besides, except the point that the apparatus starting operating in early running stage, as concerns the electric current A, the voltage V, the concentration X of ozone aqua and the flow rate Q of ozone aqua, almost all values fell in a substantial regular range. And it was found that a stable running was carried out.

Incidentally, in the figure above, as concerns the electric current, the voltage, the flow rate and the concentration of ozone aqua, it was recognized that each value has a minute variation. This reason was that the material water was taken out from a tap of water supply after the ozone aqua generation apparatus was installed on one corner in a general office building. In other words, a supply quantity of the material water (flow rate of ozone aqua) changed to receive an effect from a change of a use condition about tap water in the office, then, in proportion to this change, the values such as the electric current and the voltage changed so as to keep the concentration of ozone aqua uniformity. Accordingly, if a control for keeping the flow rate uniformly was carried out, this minute variation would disappear. Additionally, in this running test, the running had been continuously carried out for one month through the night and day without the stop caused from the membrane fouling as shown in the above-mentioned FIG. 8. And, as concerns the stability, the change was not recognized at all. Though the running was stopped after the one month passed, it was clear from this result of the test that further continuous running was possible.

Comparative Example

Figure 16:
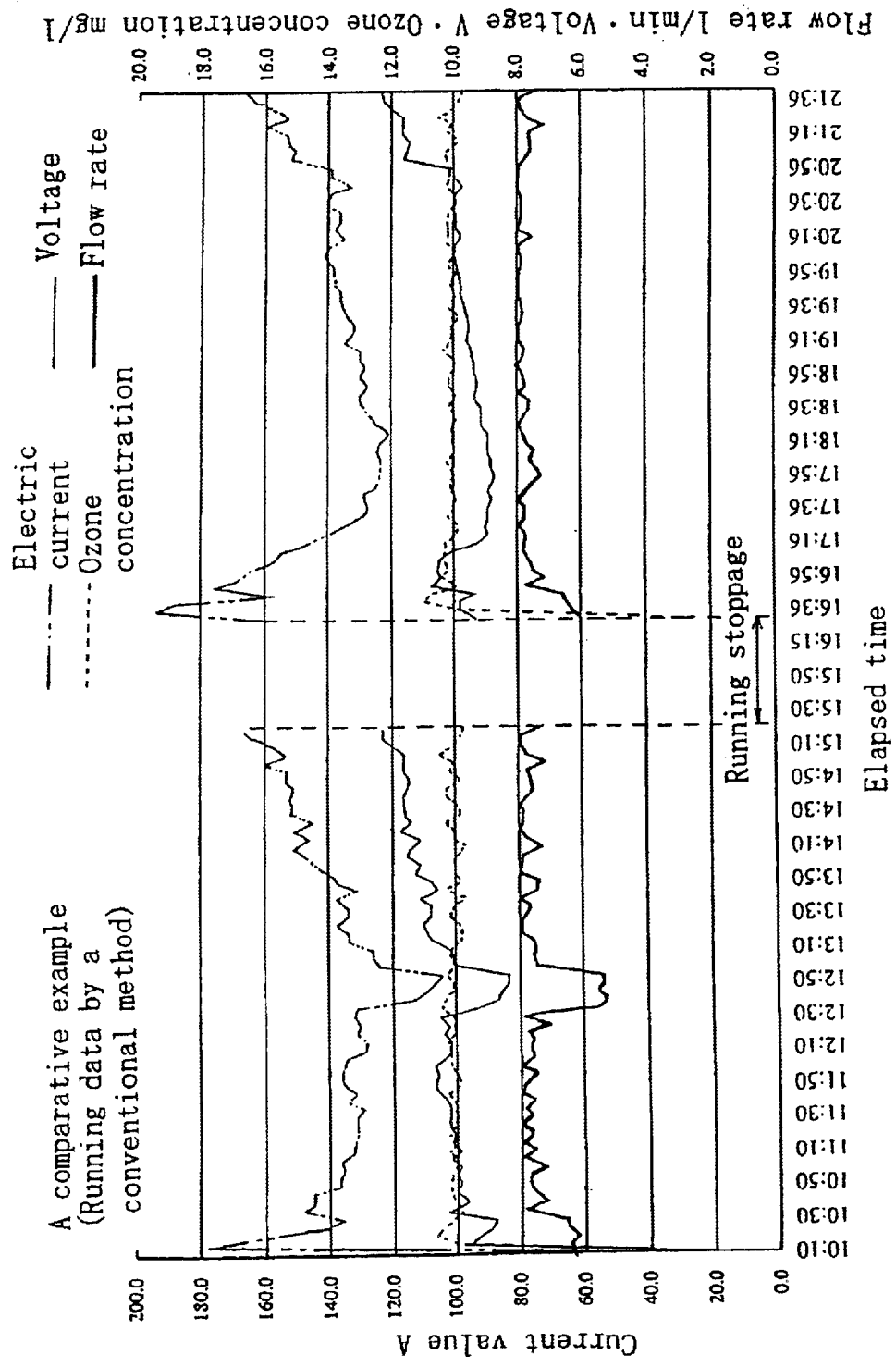
FIG. 16 shows an example of a real running time chart in a conventional method.
Figure 17:
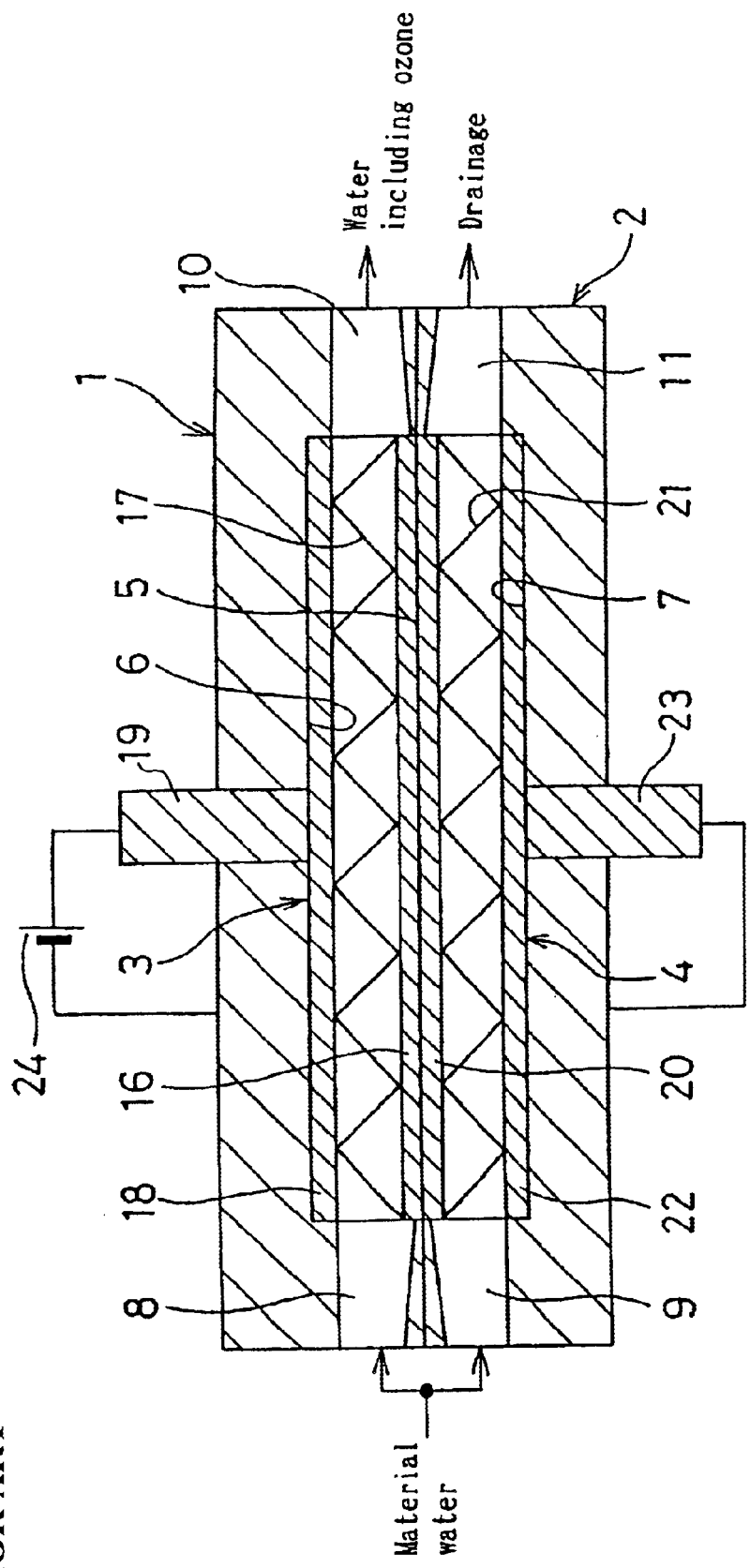
FIG. 17 shows a feature section of an example of a conventional electrolysis type ozone aqua production apparatus.
Figure 18:
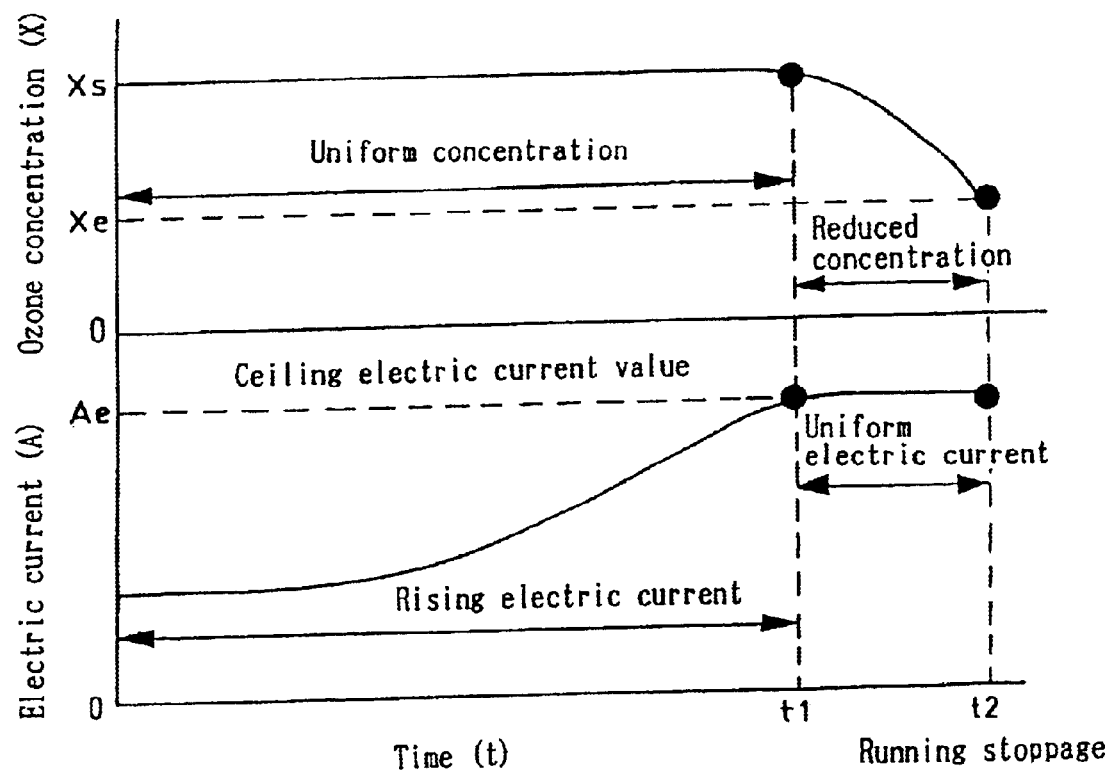
FIG. 18 shows a running time chart in a running example of the apparatus in FIG. 17.
Figure 22:
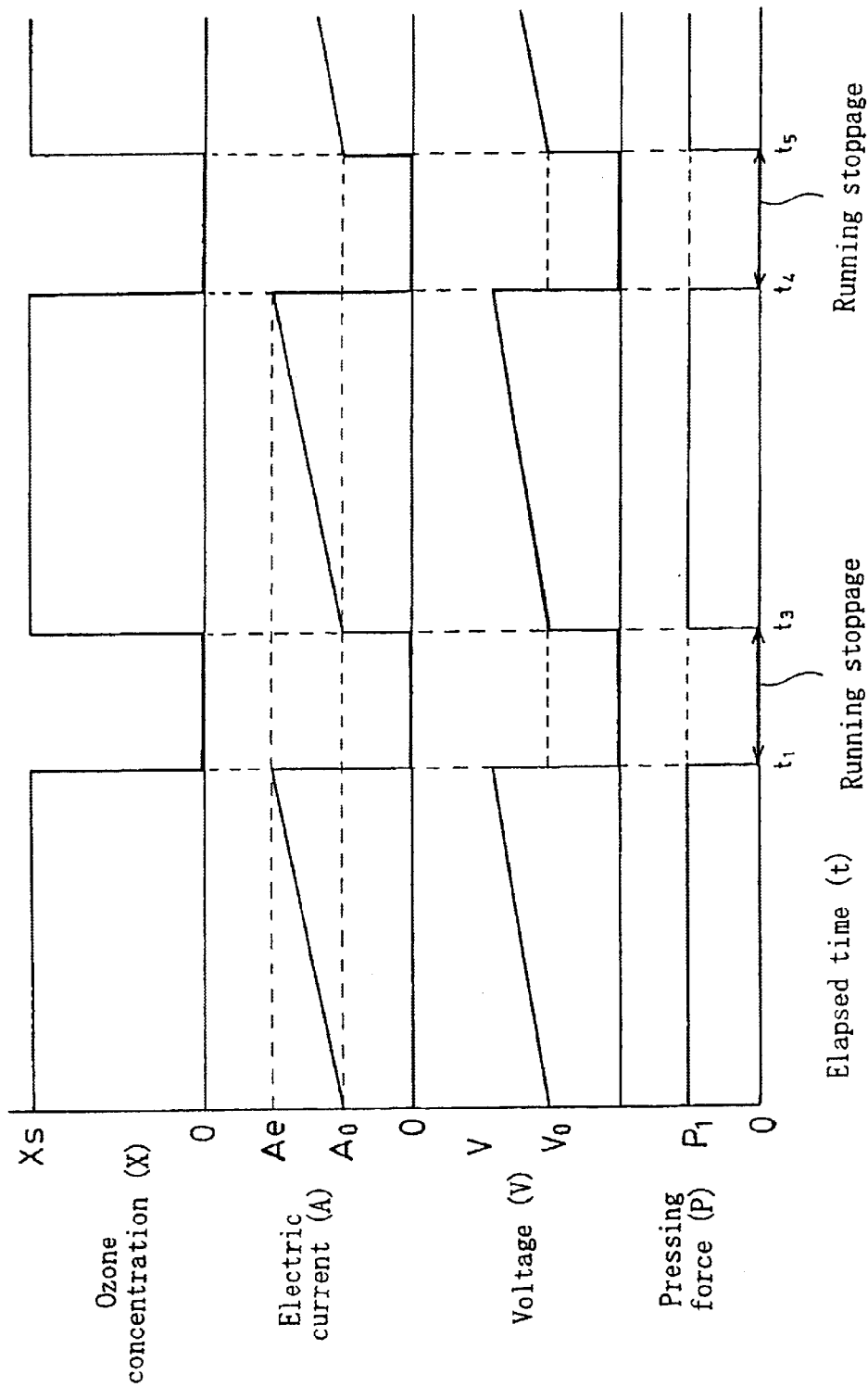
FIG. 22 shows a time chart of a conventional operational method in the apparatus of FIG. 19.
Figure 23:
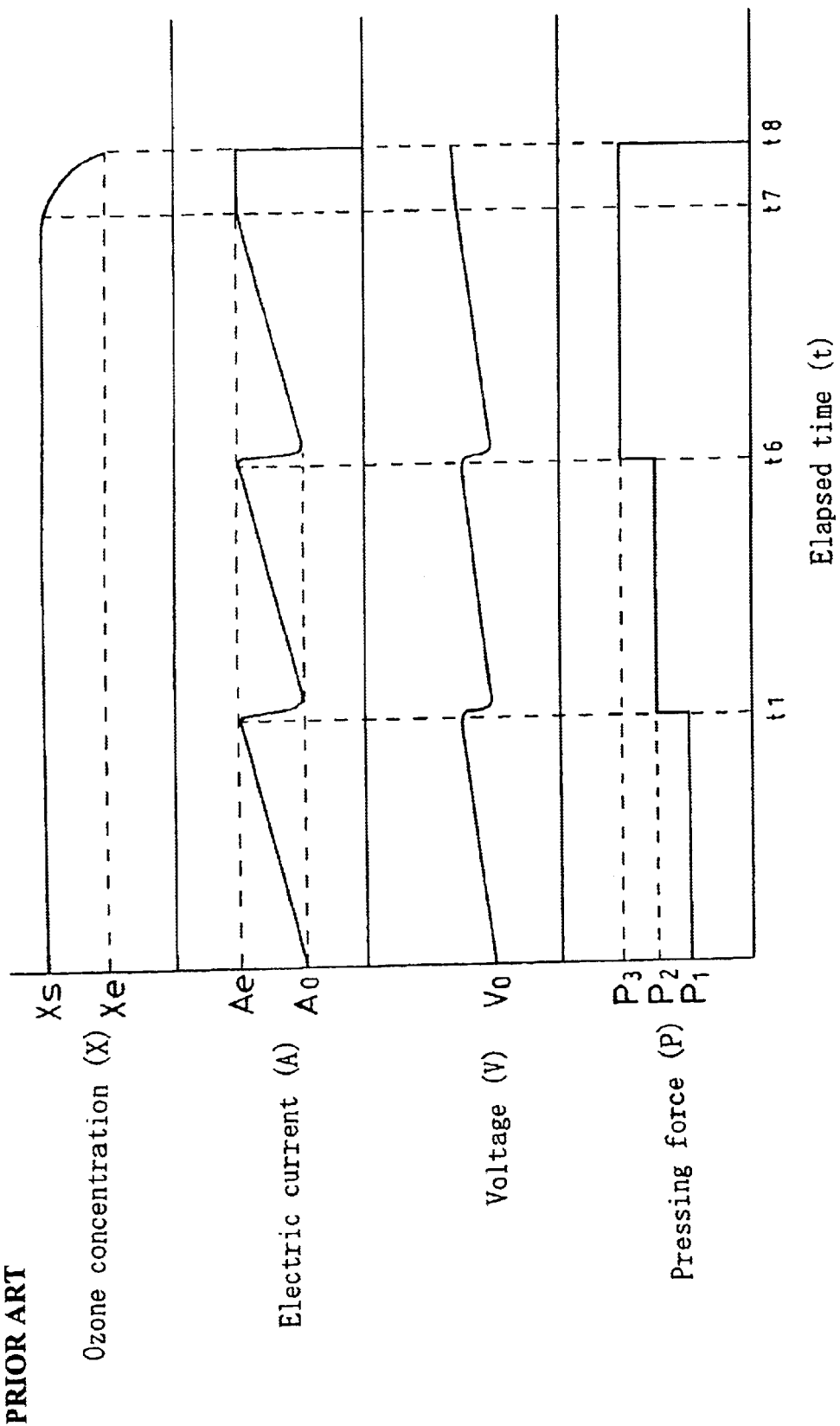
FIG. 23 shows a time chart of a conventional other operational method in the apparatus of FIG. 19.

As shown in FIG. 22, the running was carried out by means of the conventional method with use of the same apparatus as in the above example and the same condition as the above example except the operation for changing the pressing force was performed. The result is shown in FIG. 16. As was apparent from the figure above, the current value started rising when about 3 hours elapsed after start-up. When about 5 hours elapsed, the current value A reached the vicinity of the ceiling value of 180A of the apparatus. At this time, the concentration of ozone aqua was still maintained at the predetermined value of 10 ppm. So, further continuous run was possible. However, as it was judged that the current value A reached the ceiling value soon, the apparatus stopped temporarily and the anodic electrode and the cathode electrode were kept apart from the electrolyte membrane. With this condition, the apparatus was let alone for around 1 hour and 10 minutes. And, the function of the electrolyte membrane recovered. After that, with the initial operating condition, the running was begun again. Then, when about 5 hours elapsed in similar, the current value reached to the vicinity of the ceiling value of the apparatus. Incidentally, in the figure above, as concerns the electric current, the voltage and the flow rate, all values suddenly decreased during about 12:20–13:10 (while the ozone aqua concentration was generally uniformity). The reason for this is as follows. According to mentioning above, the material water was taken out from the tap of water supply in the office building. A consumption of tap water increased at the lunch break. Relating to it, a quantity of water supply to this apparatus decreased. The electric current and the voltage decreased so as to make the concentration of ozone aqua uniformity. Accordingly, as mentioned above, if the control for making the flow rate uniformity was carried out, such a decrease phenomena would disappear.

As is apparent from a comparison the example of the above present invention with the comparative example by the conventional method, in the present invention, the running can be continued for one month or more. While, in the conventional method (a method before a betterment by the present inventors), intervals of running are necessary at the rate of one hour every six hours. It is also understood from this example that, in a true meaning, the method of the present invention is the method which enables a long term continuous running. Incidentally, the life time of the electrolyte membrane depends upon water quality of material water. As is apparent from the example of FIG. 16, when about 5 hours elapses, the membrane fouling occurs. A property of water employed in the example of FIG. 16 is comparably bad for the ozone aqua production apparatus (though the water is made in KOBE and delicious to include many mineral ingredients comparatively). Regardless of the above fact, according to the method of the present invention, it gets possible to run continuously for one month or more. This data is note worthier than any data.

As described above, according to the first method concerned with the ozone aqua production method of the present invention, ozone aqua is produced to electrolyze water in the condition that the electrolyte membrane is pressed by the electrodes. And, the operation for changing the pressing force of the electrodes against the electrolyte membrane is appropriately carried out without production stop. Then, the electrolyte membrane is recovered from on the way of the deterioration process. Additionally, according to the second method, while producing ozone aqua, the current value or the voltage value changes rapidly to increase or decrease. Then, the electrolyte membrane is recovered from on the way of the deterioration process. Because of this, in both method, the long term continuous running of the electrolysis type ozone aqua production apparatus becomes possible, which has been considered to be impossibility conventionally and the heart's desire for a person skilled in the art.

Especially, as is clear from the example, the present invention enables the stable continuous running for one month or more (it has not been examined yet until when the continuous running is possible). Therefore, it is a great effect as indescribable that the present invention enables to run continuously without stoppage, which is the heart's desire of a person skilled in the art and not exaggerated.

Further, even if such an operation as for changing the pressing force against the above electrolyte membrane or for changing the electric current or the voltage forcibly is carried out, the recovery of the electrolyte membrane will reach a limit. At that time, if following things are carried out, it will become possible to extend the life time of the electrolyte membrane by leaps and bounds. The following things are that the electrolyte membrane is recovered to stop the apparatus temporarily and keep apart the electrodes from the electrolyte membrane. After that, the apparatus is run again. It cannot imagine how life extends thereby.

Additionally, if a following method for continuing the production of ozone aqua is employed, it will be possible that the running time of the ozone aqua production is extended by leaps and bounds beyond the comparison with the conventional method. The following method is that the pressing force value is changed into the high value set previously when the electrolyte membrane will be not recovered enough even if the operation for changing the pressing force, the electric current or the voltage forcibly is carried out.

As a result, it becomes possible that a unit price of ozone aqua is largely reduced, too. Because, as concerns a rate of the operation of the electrolysis ozone aqua production apparatus, a wonderful rate of the operation near to 100% is possible. The conventional rate was around 50%. Further, it is possible that the life time of the expensive electrolyte membrane is improved by leaps and bounds. Accordingly, it is possible to reduce the running cost of the apparatus and the ozone aqua product cost remarkably.

Additionally, the facilities becomes easy to be treated for a user and more spread of the ozone aqua production apparatus becomes possible. It is possible for the apparatus to be run continuously in the long term. As a result, the apparatus maintenance cost such as the exchange of the electrolyte membrane is reduced, too, in addition to the reduction of ozone production cost. And, the user is set free from the complexity of maintenance.

From the above, the factory cost of ozone aqua is reduced, as well, the ozone aqua production apparatus becomes easy to be treat for, even if, a user is an amateur in facilities. As a result, a disinfection or a cleaning by ozone aqua or other application of ozone aqua spreads out by leaps and bounds. From an environmental sanitation face of the nation, a big improvement and an effect are expected. The social spreading effect is immeasurable.

INDUSTRIAL APPLICABILITY

As is explained in detail above, in the electrolysis type ozone aqua production method and the apparatus related to the present invention, it is possible to run continuously for a long time. Accordingly, in various fields of various cleaning and disinfection by ozone aqua, the present invention is extremely useful. Additionally, the recovery method of solid polymer electrolyte membrane of the present invention is the technology which can be applied to an apparatus of every field using a solid polymer electrolyte membrane. Especially, in the continuous running of the above electrolysis type ozone aqua production apparatus, the present recovery method is extremely useful technology.

What is claimed is:

1. A method for producing water containing ozone by electrolysis, using an apparatus comprising,
an anodic electrode disposed on one side of a solid polymer electrolyte membrane and having a catalyst function for generating ozone,
a cathode electrode disposed on other side of the solid polymer electrolyte membrane,
a mechanism for advancing and reversing both or at least one of the electrodes as against the solid polymer electrolyte membrane, wherein
DC voltage is applied between the both electrodes in the state of the solid polymer electrolyte membrane is pressed by the both electrodes,
water flows on both sides of the solid polymer electrolyte membrane,
water containing ozone is produced at the anodic electrode side by electrolysis of flowing water, further,
an operation for changing the pressing force is carried out, in which the pressing force of the anodic electrode, the cathode electrode or both electrodes as against the solid polymer electrolyte membrane changes in accordance with a preset condition, after that, the pressing force returns to an original pressing force, thereby,
a recovery of the solid polymer electrolyte membrane is carried out while continuing the production of the water containing ozone.

2. The method for producing water containing ozone by electrolysis as set forth in claim 1,
the operation for changing the pressing force is carried out, in which
the pressing force of the electrodes as against the solid polymer electrolyte membrane changes with decrease, increase or these combination.

3. The method for producing water containing ozone by electrolysis as set forth in claim 1 or 2, wherein
the operation for changing the pressing force has a change pattern in which
a state that the pressing force decreases to a value less than one preset value or a state that the pressing force increases to a value more than another preset value, is maintained for a time more than a predetermined time.

4. The method for producing water containing ozone by electrolysis as set forth in claim 1, wherein the operation for changing the pressing force is repeated with a predetermined cycle.

5. The method for producing water containing ozone by electrolysis as set forth in claim 1, wherein
at least one of a concentration of ozone included in the produced water at a time point of production, an electric current value flowing between the both electrodes, a voltage value between the both electrodes and a volume of the produced water containing ozone, is kept under observation,
an operation for changing the pressing force against the solid polymer electrolyte membrane is performed to detect that the at least one concentration of ozone included in the produced water or a manufacturing capacity deteriorates to a value less than a predetermined value, and
the operation is performed once or more times.

6. The method for producing water containing ozone by electrolysis as set forth in claim 1, wherein,
when the solid polymer electrolyte membrane is not enough recovered by the operation for changing the pressing force against the solid polymer electrolyte membrane, the production of the water containing ozone is stopped, and
the both electrodes or at least one of them is kept apart from the solid polymer electrolyte membrane then
that state is held for a predetermined time, thereby
the solid polymer electrolyte membrane is recovered, after that
the production of the water containing ozone is started again on a predetermined operating condition.

7. The method for producing water containing ozone by electrolysis as set forth in claim 1, wherein,
when the solid polymer electrolyte membrane is not enough recovered by the operation for changing the pressing force against the solid polymer electrolyte membrane, the pressing force of the electrodes against the solid polymer electrolyte membrane moves to a high value set previously, thereby
the production of the water containing ozone is continued.

8. A method for producing water containing ozone by electrolysis, wherein
an anodic electrode is disposed on one side of a solid polymer electrolyte membrane, which is provided with a catalyst function for generating ozone,
a cathode electrode is disposed on other side of the solid polymer electrolyte membrane,
DC voltage is applied between the both electrodes in a condition that the both electrodes are in contact with the solid polymer electrolyte membrane,
water flows on both sides of the solid polymer electrolyte membrane,
water containing ozone is produced at the anodic electrode side by electrolysis of the flowing water,
a current value of the direct-current power source or a voltage value changes rapidly according to a preset condition, after that, returns to an original value or the vicinity of it, thereby
a recovery treatment of the solid polymer electrolyte membrane is carried out by the above operation for changing the electric current or the voltage while continuing the production of the water containing ozone.

9. The method for producing water containing ozone by electrolysis as set forth in claim 8, wherein,
in the operation for changing the electric current or the voltage,
the electric current or voltage changes from a start point value of the operation and changes in a range between zero or a minimum value of the vicinity of it and a maximum permissible value of the apparatus for producing the water containing ozone, then the states of the minimum value and the maximum permissible value are respectively kept for a predetermined time, after that,
the electric current or the voltage changes to the original value or the vicinity of it.

10. The method for producing water containing ozone by electrolysis as set forth in claim 8 or 9, wherein the operation for changing the electric current or voltage is repeated with a predetermined cycle.

11. The method for producing water containing ozone by electrolysis as set forth in claim 8 or 9, wherein
at least one of a concentration of ozone included in the produced water at a time point of production, an electric current value flowing between the both electrodes, a voltage value between the both electrodes and a volume of the produced water containing ozone, is kept under observation,
the operation for changing the electric current or voltage is performed to detect that the at least one concentration of ozone included in the produced water or a manufacturing capacity deteriorates to a value less than a predetermined value, and the operation is performed once or more times.

12. The method for producing water containing ozone by electrolysis as set forth in claim 8, wherein
while the water containing ozone is produced to press the both of electrodes or at least one of them to the solid polymer electrolyte membrane,
when the solid polymer electrolyte membrane is not enough recovered by the operation for changing the electric current or voltage, the production of the water containing ozone is stopped, and
the both electrodes or at least one of them is kept apart from the solid polymer electrolyte membrane then
that state is held for a predetermined time, thereby
the solid polymer electrolyte membrane is recovered, after that,
the production of the water containing ozone is started again on a predetermined operating condition.

13. The method for producing water containing ozone by electrolysis as set forth in claim 8, wherein
while the water containing ozone is produced to press the both of electrodes to the solid polymer electrolyte membrane,
when the solid polymer electrolyte membrane is not enough recovered by the operation for changing the electric current or voltage, the pressing force of the electrodes against the solid polymer electrolyte membrane moves to a high value set previously, thereby
the production of the water containing ozone is continued.

14. An apparatus for producing water containing ozone by electrolysis, wherein,
an anodic electrode having a catalyst function for generating ozone is disposed on one side of solid polymer electrolyte membrane,
a cathode electrode is disposed on other side of solid polymer electrolyte membrane,
an advance and reverse mechanism is arranged which enables the both electrodes or at least one of them to advance and reverse against the solid polymer electrolyte membrane,
DC voltage is applied between the both electrodes in the state that the both electrodes is pressed to the solid polymer electrolyte membrane,
water flows on the both sides of the solid polymer electrolyte membrane, then
water containing ozone is produced at the anodic electrode side by electrolysis of the flowing water, and
further comprising,
a setting device for setting an initial value of the pressing force of the both electrodes as against the solid polymer electrolyte membrane,
a concentration detection sensor for detecting a concentration of produced water containing ozone,
a first comparator for comparing the concentration detected by a concentration detection sensor with a preset predetermined value,
a first command device for setting the current value supplied between the both electrodes according to a comparison signal from the first comparator so that the concentration gets closer to a predetermined value,
a second command device by which the pressing force of the both electrodes against the solid polymer electrolyte membrane changes into a preset value to detect that an elapsed time reaches a preset predetermined value during run or that the concentration reaches a preset control start concentration, and the pressing force returns to an initial value after a predetermined time elapses.

15. An apparatus for producing water containing ozone by electrolysis, wherein
an anodic electrode having a catalyst function for generating ozone is disposed on one side of solid polymer electrolyte membrane,
a cathode electrode is disposed on other side of solid polymer electrolyte membrane,
an advance and reverse mechanism is arranged which enables the both electrodes or at least one of them to advance and reverse against the solid polymer electrolyte membrane,
DC voltage is applied between the both electrodes in the state that the both electrodes is pressed onto the solid polymer electrolyte membrane,
water flows on the both sides of the solid polymer electrolyte membrane, then
water containing ozone is produced at the anodic electrode side by electrolysis of the flowing water, and
further comprising,
a setting device for setting an initial value of the pressing force of the both electrodes as against the solid polymer electrolyte membrane,
a concentration detection sensor for detecting a concentration of produced water containing ozone,
a first comparator for comparing the concentration detected by a concentration detection sensor with a preset predetermined value,
a first command device for setting the current value supplied between the both electrodes according to a comparison signal from the first comparator so that the concentration gets closer to a predetermined value,
a second command device by which the pressing force of the both electrodes against the solid polymer electrolyte membrane changes into a preset value to detect that an elapsed time reaches a preset predetermined value during run or that the concentration reaches a preset control start concentration, and the pressing force returns to an initial value after a predetermined time elapses,
a second comparator for determining that the current value reaches a predetermined ceiling value of the apparatus,
a third command device by which the running apparatus is stopped when the second comparator detects that the current value reaches a predetermined ceiling value and when it is detected the concentration reaches a predetermined lower limit value, and the pressing force of the both electrodes or one of them against the solid polymer electrolyte membrane is released, then, the apparatus works again after a predetermined time elapses.

16. A recovery method of a solid polymer electrolyte membrane, using an apparatus for producing water containing ozone by electrolysis in which an anodic electrode having a catalyst function for generating ozone is disposed on one side of solid polymer electrolyte membrane, a cathode electrode is disposed on other side of solid polymer electrolyte membrane, an advance and reverse mechanism is arranged, which enables the both electrodes or at least one of them to advance and reverse against the solid polymer electrolyte membrane, DC voltage is applied between the both electrodes in the state that the both electrodes are pressed to the solid polymer electrolyte membrane, water flows on the both sides of the solid polymer electrolyte membrane, then water containing ozone is produced at the anodic electrode side by electrolysis of the flowing water, and in order to recover an efficiency of the solid polymer electrolyte membrane of which efficiency has deteriorated during producing the water containing ozone, an operation for changing the pressing force is carried out wherein, the pressing force of the anodic electrode, the cathode electrode or the both of them against the solid polymer electrolyte membrane changes in accordance with a preset condition, after that, returns to an original pressing force, thereby the efficiency of the solid polymer electrolyte membrane is restored.

17. The recovery method of a solid polymer electrolyte membrane as set forth in claim 16, wherein the operation changing the pressing force has a pressure change pattern in which a state that the pressing force decreases to a value less than a preset value or a state that the pressing force increases to a value more than another preset value, continues for a time more than a predetermined time.

18. A recovery method of a solid polymer electrolyte membrane, using an apparatus for producing water containing ozone by electrolysis in which an anodic electrode having a catalyst function for generating ozone is disposed on one side of solid polymer electrolyte membrane, a cathode electrode is disposed on other side of solid polymer electrolyte membrane, an advance and reverse mechanism is arranged which enables the both electrodes or at least one of them to advance and reverse against the solid polymer electrolyte membrane, DC voltage is applied between the both electrodes in the state that the both electrodes is pressed onto the solid polymer electrolyte membrane, water flows on the both sides of the solid polymer electrolyte membrane, then water containing ozone is produced at the anodic electrode side by electrolysis of the flowing water, and in order to recover an efficiency of the solid polymer electrolyte membrane of which efficiency has deteriorated during producing the water containing ozone, an operation for changing the electric current or voltage is carried out wherein, the current value or the voltage value changes rapidly according to a preset condition, after that, returns to an original value or the vicinity of it, thereby, an efficiency of the solid polymer electrolyte membrane recovers.

19. The recovery method of a solid polymer electrolyte membrane as set forth in claim 18, wherein, in the operation for changing the electric current or the voltage, the electric current or voltage changes from a start point value of the operation and changes in a range between zero or a minimum value of the vicinity of it and a maximum permissible value of the apparatus for producing the water containing ozone, then, the states of the minimum value and the maximum permissible value are respectively kept for a predetermined time, after that, the electric current or the voltage changes to the original value or the vicinity of it.

20. A recovery method of a solid polymer electrolyte membrane, wherein an anodic electrode and a cathode electrode are respectively disposed on both sides of the solid polymer electrolyte membrane, while an electrochemical reaction is carried out in the state that at least one of the both electrodes is pressed onto the solid polymer electrolyte membrane, the pressing force of the anodic electrode, the cathode electrode or the both of them against the solid polymer electrolyte membrane changes in accordance with a preset condition, after that, returns to an original pressing force, thereby the efficiency of the solid polymer electrolyte membrane deteriorated in a reaction process is restored.

21. A recovery method of a solid polymer electrolyte membrane, wherein an anodic electrode and a cathode electrode are respectively disposed on both sides to solid polymer electrolyte membrane, while an electrochemical reaction is carried out in the state that at least one of the both electrodes is pressed onto the solid polymer electrolyte membrane, the current value or the voltage value between the both electrodes changes rapidly according to a preset condition, after that, returns to an original value or the vicinity of it, thereby, an efficiency of the solid polymer electrolyte membrane deteriorated in a reaction process is restored.

* * * * *